United States Patent
Sahadi

(10) Patent No.: US 10,438,141 B2
(45) Date of Patent: Oct. 8, 2019

(54) VENUE TRAFFIC FLOW MANAGEMENT

(71) Applicant: Blazer and Flip Flops, Inc, San Diego, CA (US)

(72) Inventor: Scott Sahadi, Solana Beach, CA (US)

(73) Assignee: Blazer and Flip Flops, Inc, San Diego, CA (US)

( * ) Notice: Subject to any disclaimer, the term of this patent is extended or adjusted under 35 U.S.C. 154(b) by 0 days.

(21) Appl. No.: 16/010,349

(22) Filed: Jun. 15, 2018

(65) Prior Publication Data

US 2018/0349808 A1 Dec. 6, 2018

Related U.S. Application Data

(63) Continuation-in-part of application No. 15/828,120, filed on Nov. 30, 2017, now abandoned.

(60) Provisional application No. 62/428,303, filed on Nov. 30, 2016.

(51) Int. Cl.
*G06Q 10/04* (2012.01)
*G06Q 50/14* (2012.01)
*H04W 4/021* (2018.01)

(52) U.S. Cl.
CPC ......... *G06Q 10/047* (2013.01); *G06Q 50/14* (2013.01); *H04W 4/021* (2013.01)

(58) Field of Classification Search
CPC ........ G06Q 10/02; G06Q 30/02; G06Q 20/20; G06Q 50/12; G06Q 10/06; G06Q 10/06311; G06Q 30/0238; G07C 2011/02; G07C 2011/04; Y04S 10/54; H04M 3/5238; G07G 1/0036
See application file for complete search history.

(56) References Cited

U.S. PATENT DOCUMENTS

| | | |
|---|---|---|
| 2002/0128768 A1 | 9/2002 | Nakano et al. |
| 2003/0102956 A1* | 6/2003 | McManus ............. G07C 11/00 340/5.2 |
| 2007/0129082 A1 | 6/2007 | Thacher |
| 2008/0045138 A1 | 2/2008 | Milic-Frayling et al. |
| 2010/0225469 A1 | 9/2010 | Yoshioka et al. |
| 2011/0046881 A1 | 2/2011 | Karaogz |
| 2011/0307547 A1* | 12/2011 | Backer ................. G06Q 10/02 709/203 |

(Continued)

FOREIGN PATENT DOCUMENTS

WO  WO 2018/165147  9/2018

OTHER PUBLICATIONS

U.S. Appl. No. 15/980,733 Office Action dated Nov. 21, 2018.

(Continued)

*Primary Examiner* — Dung Hong
(74) *Attorney, Agent, or Firm* — Polsinelli LLP

(57) ABSTRACT

A platform provides recommendations for points of interest in a venue to venue attendees. Different points of interest are recommended in different amounts in order to prevent congestion in the venue in the form of extremely long queues or extremely large crowds. To achieve this, the platform divides a large group of venue attendees into multiple sub-groups, with each sub-group being recommended a different point of interest, and the size of each sub-group based on a difference between an optimal queue or crowd size and an actual queue or crowd size of a queue or crowd associated with that point of interest.

19 Claims, 14 Drawing Sheets

(56) References Cited

U.S. PATENT DOCUMENTS

| | | |
|---|---|---|
| 2012/0064919 A1 | 3/2012 | Purdy |
| 2012/0116863 A1* | 5/2012 | Boss ................. G06Q 30/0235 705/14.35 |
| 2013/0024203 A1 | 1/2013 | Flores et al. |
| 2014/0280060 A1 | 9/2014 | Campbell et al. |
| 2014/0324488 A1* | 10/2014 | Boccelli ................. G06Q 10/02 705/5 |
| 2015/0081348 A1* | 3/2015 | Avera ................. G06Q 30/0269 705/5 |
| 2015/0241238 A1 | 8/2015 | Bass et al. |
| 2016/0021507 A1* | 1/2016 | Gaines ................. H04W 4/023 455/456.2 |
| 2016/0093334 A1 | 3/2016 | Kim et al. |
| 2016/0116292 A1 | 4/2016 | An |
| 2016/0155310 A1 | 6/2016 | Joao et al. |
| 2016/0307265 A1* | 10/2016 | Seaward ............ G06Q 30/0631 |
| 2016/0353235 A1* | 12/2016 | Williams ................. H04W 4/02 |
| 2016/0353249 A1 | 12/2016 | Khatam et al. |
| 2017/0048664 A1 | 2/2017 | Zhang et al. |
| 2017/0054849 A1* | 2/2017 | Torre ................. H04M 3/5191 |
| 2017/0178084 A1 | 6/2017 | Barreira Avegliano et al. |
| 2017/0270734 A1* | 9/2017 | Geraghty ............... G07C 11/00 |
| 2017/0353582 A1* | 12/2017 | Zavesky ................. H04W 4/90 |
| 2018/0349393 A1 | 12/2018 | Oberdorfer |
| 2018/0352373 A1 | 12/2018 | Sahadi |
| 2018/0352378 A1 | 12/2018 | Sahadi |
| 2019/0095454 A1 | 3/2019 | Sahadi |

OTHER PUBLICATIONS

PCT Application No. PCT/US2018/021130 International Search Report and Written Opinion dated Jun. 26, 2018.
U.S. Appl. No. 16/010,355 Office Action dated Feb. 26, 2019.

* cited by examiner

VENUE TRAFFIC FLOW MANAGEMENT

CROSS-REFERENCE TO RELATED APPLICATIONS

The present application is a continuation-in-part of U.S. application Ser. No. 15/828,120 filed Nov. 30, 2017 and entitled "Development, Deployment and Real Time Management of Highly Personalized Experiences Occurring at Managed Locations," and claims the priority benefit of U.S. provisional application No. 62/428,303 filed Nov. 30, 2016 and entitled "Development, Deployment and Real Time Management of Highly Personalized Experiences Occurring at Managed Locations," the disclosures of which are hereby incorporated by reference.

BACKGROUND

1. Field

The present teachings are generally related to an experience development and management platform. More specifically, the present teachings relate to development, deployment and real time management of highly personalized experiences occurring at managed locations.

2. Description of the Related Art

Locations that host visitors provide a wide range of experiences. The venues often have special events such as entertainment performances, provide attractions, such as rides, and provide various goods and services, including foods, beverages, souvenirs and other merchandise, and many others. Items available at any given point of interest within a location often change throughout a day or season, and other changing factors, such as waiting lines, can further impact a guest or customer experience. In such a complex and changing environment, it is very difficult to provide visitors with relevant information at all times as the visitors move from point-to-point within the location managed by a host. Also, as many venues are large and complex, challenges exist for personnel to keep track of what is happening throughout a location at a given time and to help each visitor have a favorable experience throughout a visit, and challenges exist for visitors to communicate among themselves or communicate with the personnel of a venue. Most locations that host these experiences provide static paper maps, brochures or signs that provide guests information about a location and encourage engagement in one or more activities at the location. Some provide additional information via website or apps that contain general information about the venue and some updated information, such as event schedules.

However, the quantity of experiences and points of interest at venues can be overwhelming for venue attendees. Information concerning these experiences and points of interest can be difficult or impossible for attendees to find, as not all of it is publically accessible, and any information that is available might be difficult to parse in any meaningful way. As such, attendees, especially in groups, often must spend long periods of time deliberating and planning routes and itineraries that makes sense based on their locations, their likes, their dislikes, and so forth—and even so, they still might make poor choices in light of missing inventory at restaurants, long queues at certain points of interest, or other discouraging situations. As such, a system is needed to intelligently make recommendations to users and to groups of users based on different types of information about a venue and the user(s).

SUMMARY

A method for itinerary personalization for a first venue attendee in a predetermined venue area is claimed. The method includes identifying a number of venue attendees in the plurality of venue attendees. The method also includes retrieving locations of a plurality of points of interest located within the predetermined event venue area, wherein each of the plurality of points of interest corresponds to a queue of a plurality of queues. The method also includes identifying a plurality of queue sizes by identifying a queue size of each queue of the plurality of queues. The method also includes calculating an optimal queue size to be an average queue size based on a sum of the plurality of queue sizes and the number of venue attendees in the plurality of venue attendees. The method also includes dividing the plurality of venue attendees into a plurality of groups, wherein each group of the plurality of groups corresponds to one of the plurality of points of interest and to the queue corresponding to the point of interest, wherein a size of each group is based on a difference between the optimal queue size and the queue size of to the queue corresponding to the group. The method also includes generating a plurality of recommendations, wherein each recommendation recommends one of the plurality of points of interests. The method also includes sending the plurality of recommendations to a plurality of attendee mobile devices corresponding to the plurality of venue attendees so that a different point of interest of the plurality of points of interest is recommended to each group of the plurality of groups based on the queue corresponding to the group.

A system that generates a personalized itinerary for a venue attendee in a predetermined venue area is claimed. The system includes a memory that stores instructions and locations of a plurality of points of interest located within the predetermined event venue area, wherein each of the plurality of points of interest corresponds to a queue of a plurality of queues. The system also includes a processor, wherein execution of the instructions by the processor causes the processor to perform system operations. The system operations include identify a number of venue attendees in the plurality of venue attendees. The system operations also include identifying a plurality of queue sizes, wherein each queue of the plurality of queues corresponds to a queue size of the plurality of queue sizes. The system operations also include calculating an optimal queue size to be an average queue size based on a sum of the plurality of queue sizes and the number of venue attendees in the plurality of venue attendees. The system operations also include dividing the plurality of venue attendees into a plurality of groups, wherein each group of the plurality of groups corresponds to a queue of the plurality of queues and wherein a size of the group is based on a difference between the optimal queue size and the queue size corresponding to the queue. The system operations also include generating a plurality of recommendations, wherein each recommendation recommends one of the plurality of points of interests. The system also includes a communication transceiver that sends the plurality of recommendations to a plurality of attendee mobile devices corresponding to the plurality of venue attendees so that a different point of interest of the plurality of points of interest is recommended to each group of the plurality of groups based on the queue corresponding to the group.

Another method for itinerary personalization for a plurality of venue attendees in a predetermined venue area is claimed. The method includes identifying a number of venue attendees in the plurality of venue attendees. The method also includes retrieving locations of a plurality of points of interest located within the predetermined event venue area. The method also includes identifying a plurality of crowd sizes, wherein each of a plurality of crowds located within the predetermined venue area corresponds to one of the plurality of crowd sizes. The method also includes calculating an optimal crowd size to be an average crowd size based on a sum of the plurality of crowd sizes and the number of venue attendees in the plurality of venue attendees. The method also includes dividing the plurality of venue attendees into a plurality of groups, wherein each group of the plurality of groups corresponds to a point of interest of the plurality of points of interest and wherein a size of the group is based on a crowd of the plurality of crowds appearing along at least one path to from the group to the point of interest and wherein a size of the group is based on a difference between the optimal crowd size and the crowd size corresponding to the crowd. The method also includes generating a plurality of recommendations, wherein each recommendation recommends one of the plurality of points of interests. The method also includes sending the plurality of recommendations to a plurality of attendee mobile devices corresponding to the plurality of venue attendees so that a different point of interest of the plurality of points of interest is recommended to each group of the plurality of groups based on the point of interest corresponding to the group.

DETAILED DESCRIPTION

Figure 1:
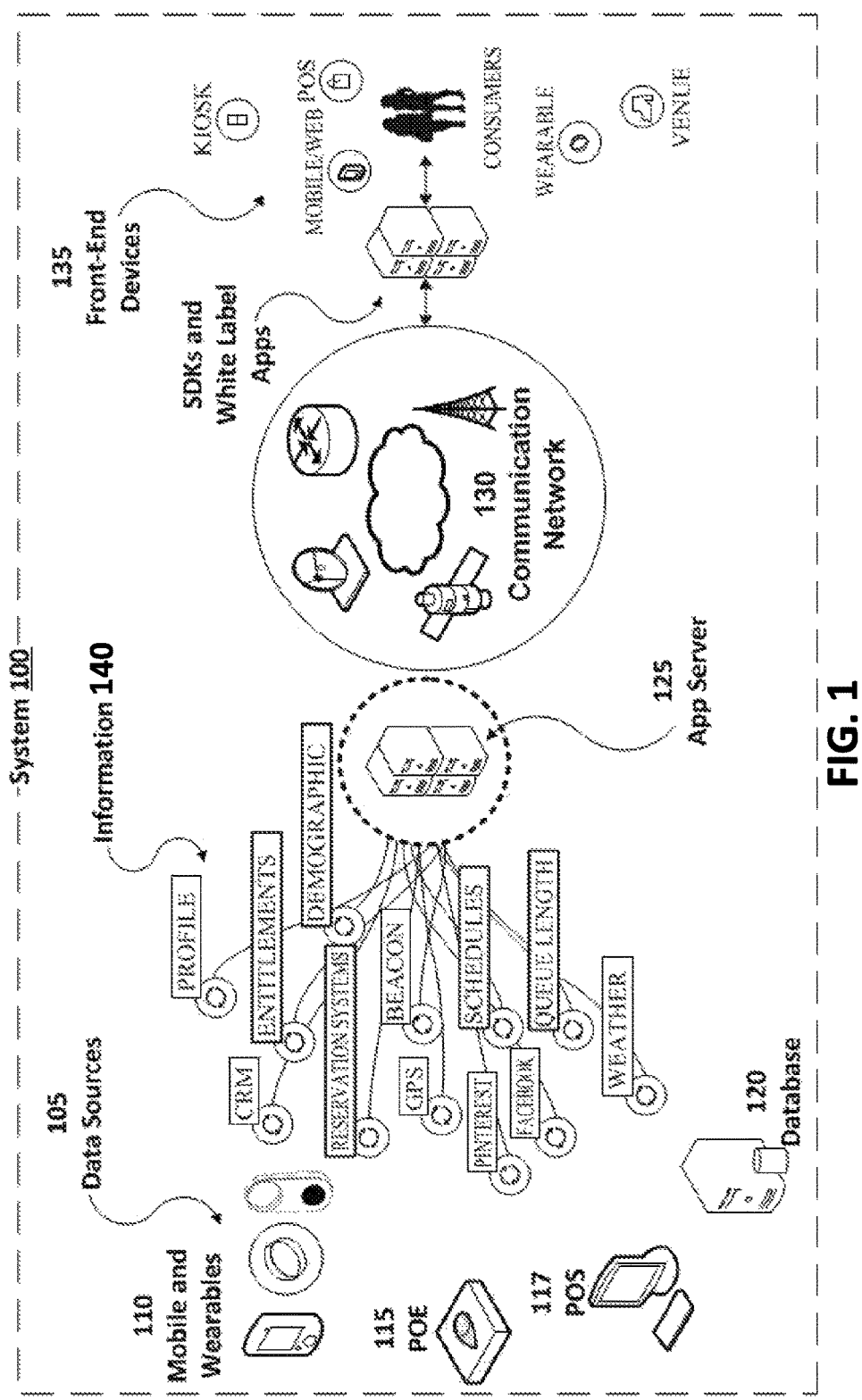
FIG. 1 illustrates a system architecture for personalizing journeys and itineraries.

A platform is described herein with various methods, systems, components, processes, services and the like that facilitate the design, creation, delivery and management of experiences at locations and venues that are optionally managed by a host. The platform generates a personalized itinerary and corresponding map for a user within a venue. The personalized itinerary includes at least one recommended point of interest, the recommendation generated based on a location of the recommended point of interest relative to a location of the user, and based on a comparison between user profile information concerning the user and point of interest information concerning the recommended point of interest. The recommended point of interest may also be recommended based on estimated wait times, queue lengths, or other information obtained by the platform's servers.

Locations, areas, or venues as described herein may include entertainment venues, malls, stores, theme parks, campuses, cruise ships, schools, universities, arenas, public parks, resorts, airports, terminals, tourist attractions, monuments, stations, markets, districts (e.g., municipal districts), stadiums, predetermined geographical areas, cruise routes, travel routes, cities, counties, countries, continents, or a combination thereof. These and other locations are collectively referred to throughout this disclosure interchangeably as "venues,", "areas," or "locations," and reference to any of the foregoing should be understood to encompass one or more of these, except where context indicates otherwise. Such locations, areas, or venues are hosted by parties such as commercial enterprises, non-profit entities, educational entities, and federal, state and municipal governments, collectively referred to herein as "hosts," "managers," or "owners." Such locations attract and host thousands of people (referred to herein as "visitors," "guests," and "customers") and provide a wide range of experiences. Such locations, areas, or venues may have predetermined boundaries that may be used as geofence boundaries that, when crossed by a location-tracking device whose location is determined via Global Navigation Satellite System (GNSS) or proximity to short-range wireless beacon devices, may trigger actions as described further herein.

The platform of the present disclosure enables the creation of personalized, relevant experiences that are delivered to guests at one or more points of interest within a location at the right time, taking into account a wide range of dynamic factors. By delivering a series of such experiences over the course of a visit, through a dynamic, personalized itinerary, a host can provide guests with an optimized overall experience while using the resources that are required to provide such experiences more efficiently and more profitably.

The present disclosure further includes a wide range of systems, methods, components, processes, and the like that facilitate the development and operation of the platform. For example, the platform may include methods and systems for developing and managing a user profile or identity, such as based on demographic factors, past history, and user behavior, such as to enable provision of personalized experiences, recommendations, itineraries and communications. The platform may include facilities for automating the creation, assembly, delivery, and management of experiences, including facilities for connecting to and integrating with relevant systems (such as inventory systems, ticketing and entitlement management systems, reservations systems, scheduling systems, and many others), for extracting, transforming and loading data to and from such systems, and for using machine learning to automate the completion of various methods, such as generation of relevant recommendations, customization of communications, optimization of monetization, optimization of experiences, optimization of itineraries, and others.

The platform may further include various methods for facilitating communication among hosts, personnel and visitors. These methods include determining that a user has entered a managed location by a computing device and identifying user contacts within the venue. The methods further include transmitting messages and other content to computing devices associated with each user contact within the venue regarding the user within the venue.

The present teachings further include methods for providing a dynamic map that is configured for display on a computing device, including providing graphical images of a venue and of relevant points of interest within the venue, with various interface elements, such as icons, logos, directional indicators, and the like that facilitate understanding about the venue. The map may provide a navigation interface, such as for routing a user to one or more points of interest in a location, such as guiding a user through one or more steps of an itinerary. The map may further include providing a visual update of the user on the map as the visitor moves through the venue and providing a personalized message or other content to the visitor regarding the venue, such as based on user data collected while the user is in the venue or other information about the user.

The present teachings also include methods for determining wait times and using wait time information as a factor for designing and delivering experiences. The methods may include receiving direct wait time data for a point of interest, receiving location map data, and receiving additional data including at least one of network traffic measurement data, entitlement redemption data, and show or event schedule data. The methods may further include determining a wait time and reporting the wait time to a remote device.

The present teachings may further include methods for engaging with a user within a venue. The method may include setting a first rule for a promotion provided by an application executing on a server. The first rule may indicate to which users within a venue the promotion will be available. The method may further include communicating the promotion to a plurality of user devices within the venue and that correspond to the first rule. The user devices may be associated with users within the venue. The method may also include updating the promotion before the promotion ends for at least one of the plurality of users.

The terms "a" or "an," as used herein, are defined as one or more than one. The term "another," as used herein, is defined as at least a second or more. The terms "including" and/or "having", as used herein, are defined as comprising (i.e., open transition).

The present teachings generally include design, creation, development, assembly, provisioning, delivery and management of one or more personalized, timely experiences at one or more points of interest in one or more managed or hosted locations. For convenience these and other elements and capabilities of the platform are collectively referred to herein as "management" or "real time management" of experiences, except where context indicates otherwise. A managed location can include any of a wide variety of locations or venues as disclosed throughout this disclosure or known by those of skill in the art, such as a venue, stadium, arena, public park, public space or district, concert hall, amusement park, theme park, water park, block party, house party, beer garden, mall, store, monument, tourist attraction, and many others. Managed locations can also include multiple premises that as a whole can constitute managed locations, such as, without limitation, a series of franchised locations. Managed locations can also include mobile platforms such as watercraft, cruise liners, trains, and aircraft. It will be appreciated in light of the disclosure that an entertainment venue, such as a theme park, is but one managed location in which the present teachings can be implemented. Managed locations can also include locations (one or many) of an enterprise, brand or other entity where physical assets of the enterprise are located. Managed locations can also include any venue, store location, mall, theme park, city park, village, campus, cruise ship dock, airport terminals, parking structures, and many others.

A platform provides recommendations for points of interest in a venue to venue attendees. Different points of interest are recommended in different amounts in order to prevent congestion in the venue in the form of extremely long queues or extremely large crowds. To achieve this, the platform divides a large group of venue attendees into multiple sub-groups, with each sub-group being recommended a different point of interest, and the size of each sub-group based on a difference between an optimal queue or crowd size and an actual queue or crowd size of a queue or crowd associated with that point of interest.

FIG. 1 illustrates a system architecture for personalizing journeys and itineraries. Uses of the system 100 of FIG. 1 may include live, dynamic mapping that utilizes branding, including hyper-local marketing. The system 100 of FIG. 1 includes an ecosystem of data sources 105 such as mobile devices and/or wearable devices 110, point-of-entry/-exit (POE) terminals 115, point-of-sale (POS) terminals 117, and databases 120. Communicatively coupled to data sources 105 are back-end application servers 125. In system 100, application servers 125 can ingest, normalize and process data collected from mobile devices 110 and various POS or POE terminals 115. Types of information 140 gathered from data sources 105 and processed by back-end application servers 125 are generally inclusive of identity information such as user profiles, customer relationship management (CRM) data, entitlements, demographics, reservation systems and social media sources like Pinterest™ and Facebook™ data. Information 140 gathered from data sources 105 and processed by back-end application servers 125 also includes proximity/location information gathered using GNSS receivers such as Global Positioning System (GPS) receivers of mobile/wearable devices 100 and/or via proximity between mobile/wearable devices 100 and beacons that emit short-range wireless signals (e.g., Bluetooth®, Bluetooth® LE, iBeacon, NFC, RFID, WiFi, radio). Information 140 gathered from data sources 105 and processed by back-end application servers 125 also includes time-related data, such as schedules, weather, and queue length.

Mobile and wearable devices 110 can execute applications via processors that make use of sensors and receivers of the respective mobile and wearable devices 110 to generate customer engagement data and then share that customer engagement data as the information 140 to the application server(s) 125. The customer engagement data/information 140 may include, for example, current and prior physical locale within a venue as well as wait times and travel times (e.g., how long was a customer at a particular point in a venue and how long did it take the customer to travel to a further point in a venue), paths to certain point on the map, and other information. Mobile devices 110 are inclusive of wearable devices. Wearable devices (or 'wearables') are any type of mobile electronic device that can be worn on the body or attached to or embedded in clothes and accessories of an individual, such as wristwatches, wristbands, armbands, chest bands, ankle bands, glasses, headworn devices, devices integrated into clothing (including shoes, pants, shirts, jackets, hats, and others), and others. Processors and sensors associated with a wearable can gather, process, display, and transmit and receive information, including location information, motion information and physiological information, among many other types.

With continued reference to FIG. 1, the POS data may be gathered at point of entry (POE) 115, or point of sale (POS) terminals 117 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110. POE terminals 115 and POS terminals 117 alike may include or be connected to beacon devices using short-range wireless communication transceivers to communicate with the mobile and wearable devices 110 and thereby determine a location of the mobile and wearable devices 110 (or velocity, or heading, or other information 140 concerning the mobile and wearable devices 110) relative to known location of the beacon based on a known signal strength (and a known signal range at the known signal strength) of the beacon.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of a communications network 130, either directly through the communication network 130 or software development kit (SDK) instructions called by particular software applications (e.g., white label apps) run at the app server(s) 125, at the front-end devices 135, at the data sources 105, at a device along the way in the communication network 130, or some combination thereof. The communications network 130 may be a local, proprietary network (e.g., an intranet) and/or may be a part of a larger wide-area network. The communication network 130 may include a variety of connected computing devices that provide one or more elements of a network-based service. The communications network 130 may include actual server hardware or virtual hardware simulated by software running on one or more actual machines thereby allowing for software controlled scaling in a cloud environment.

The communications network 130 may allow for communication between data sources 105 and front-end devices 135 via any number of various communication paths or channels that collectively make up the communications network 130. Such paths and channels may operate utilizing any number of standards or protocols including TCP/IP, 802.11, Bluetooth, iBeacon, GSM, GPRS, 4G, and LTE. The communications network 130 may be a local area network (LAN) that can be communicatively coupled to a wide area network (WAN) such as the Internet operating through one or more network service provider.

Information received and provided over a communications network 130 may come from other information systems such as GPS, cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy or iBeacon beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above. In some cases, front-end devices 135 may include any one of the data sources 105 providing the information 140 to the app server 125, such as one of the mobile/wearable devices 110, one of the points of exit/entry 115, one of the points of sale 117, or one of the databases 120.

The system 100 of FIG. 1 provides services for personalizing journeys and itineraries. For example, a dynamic map including markers corresponding to various captured photos, recorded videos, transaction receipts, messages, social media posts, and other events may be generated at a mobile computing device 110, at one or more application server(s) 125, at one or more front-end-devices 135, or some combination thereof. Any of the devices illustrated in FIG. 1, including the mobile computing devices 110, application server(s) 125, and front-end devices 135 may include at least one computing system 800, or may include at least some of the components illustrated in FIG. 8.

Figure 2:
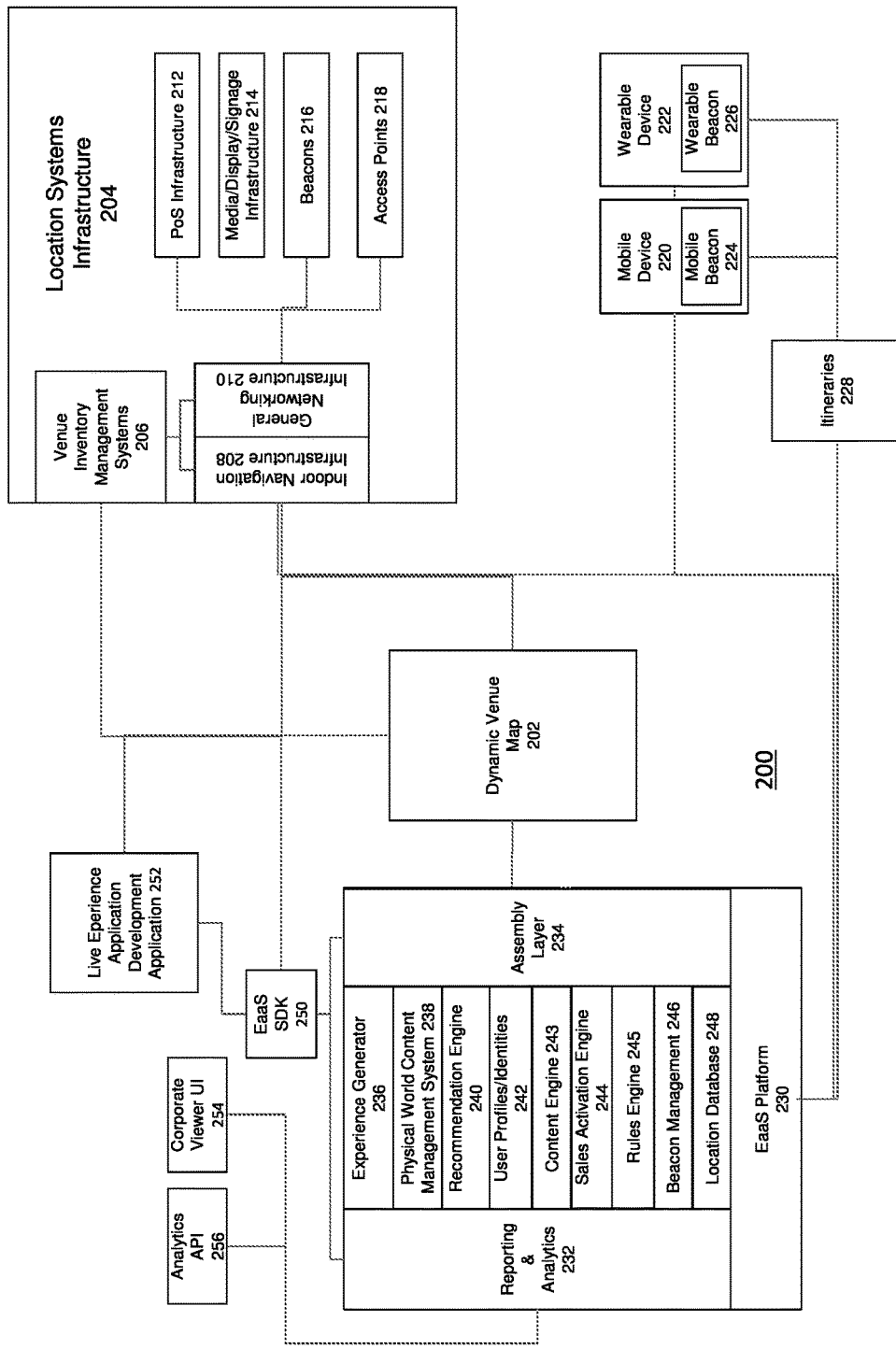
FIG. 2 illustrates a technology stack for real-time management of experiences with respect to personalized itineraries.

FIG. 2 illustrates a technology stack for real-time management of experiences with respect to personalized itineraries. More specifically, FIG. 2 depicts a physical world content management system 200. The physical world content management system 200 can include a dynamic venue map 202 and various elements of a venue systems infrastructure 204. The management system 200 can also include a mobile device 220 and a wearable device 222. The management system 200 can also manage various itineraries 228, such as for users or groups of users. The management system 200 can include an experience as a service (EaaS) platform 230 with a wide range of capabilities, as well as facilities for various interfaces to the platform 230, such as interfaces for analytics 256 and for other users of an enterprise, such as through a corporate or commercial viewer 254. The management system 200 may also include an EaaS software development kit (SDK) 250 for designing, developing and assembling experiences. The management system 200 can further include a live experience development application 252 for developing experiences.

The EaaS platform 230 of FIG. 2 may be run via the app server(s) 125 of FIG. 1. The mobile device 220 and wearable device 222 of FIG. 2 may act as the mobile/wearable device 110 of FIG. 1 and/or the front-end device 135 of FIG. 1. The locations system infrastructure 204 of FIG. 2 may include the element(s) of the data sources 105 and/or the app server 125 of FIG. 1.

The dynamic venue map 202 can connect to or be integrated with the EaaS platform 230, such that the experiences created, delivered and managed using the platform can include elements presented on the venue map 202, such as to visitors and to staff of the host. The SDK 250 and development application 252 may also generate and tweak a venue map 202, such as to allow developers to consider and integrate points of interest, routes, inventory locations, service locations, and other factors on the map when designing and delivering experiences. The venue map 202 may integrate any of the information 140 discussed with respect to FIG. 1 and may also connect to or integrate with the systems infrastructure 204 of a location, such as to exchange data with elements of the systems infrastructure 204 that are relevant to experiences, such as sales and inventory data contained in point of sale (POS) infrastructure 212, to exchange location data with location-specific or navigation infrastructure elements 208, such as beacons 216 and access points 218 (e.g., WiFi hotspots and/or cell towers), and to coordinate with content on media and signage infrastructure 214. The venue map 220 may also connect to mobile devices 220, wearable devices 222 and the itineraries 228, so that map information can be presented on a visitor's devices, with appropriate itinerary information, messages, and the like, optionally presented in context using the map 202 as a presentation layer. The itineraries 228 may be presented as lists, as a set of directions from the user's location to each consecutive POI/experience, or as a map that points out the user's location relative to each consecutive POI/experience (as in FIG. 4, FIG. 5, FIG. 6). In many aspects of the present teachings, the dynamic venue map 202 can connect to the EaaS platform 230 through the physical world content management system 238 and through use of the EaaS SDK 250, which may include various elements for creating, assembling, delivering and managing experiences.

In aspects of the present teachings, the location systems infrastructure 204 can include a venue inventory management system 206 and an indoor navigation infrastructure 208. Moreover, the location systems infrastructure 204 can make use of general networking infrastructure 210. The location systems infrastructure 204 can include a POS infrastructure 212, a media/display/signage infrastructure 214, beacons 216, and access points 218. The venue inventory management systems 206 can connect to the dynamic venue map 202, the indoor navigation infrastructure 208 and general networking infrastructure 210. The general networking infrastructure 210 can connect to a POS infrastructure 212, the media/display/signage infrastructure 214, the beacons 216, the access points 218, and the like.

The mobile device 220 can include a mobile beacon 224. The mobile device 220 can also connect to a wearable device 222 and can access the itineraries 228, such as to present an itinerary of a user or group on the device. The mobile device 220 can also connect to the EaaS Platform 230, the dynamic venue map 202, the location systems infrastructure 204 and the EaaS SDK 250 to provide and receive data necessary to manage an experience, to receive and redeem entitlements, to communicate about experiences, to receive recommendations, to receive itineraries, and the like. In additional aspects of the present teachings, the mobile device 220 or wearable device 222 can connect to the location systems infrastructure 204, such as using the indoor navigation infrastructure 208 or using other location capabilities, such as global positioning system (GPS) or cellular triangulation, so that the host can maintain precise understanding of the user's location at all times. In aspects, the mobile device 220 or wearable device 222 can connect to the location systems infrastructure 204 through the venue inventory management systems 206, such as where the mobile device 220 or wearable device 222 is used to order or purchase items, either at a point of sale or point of interest, or remotely.

In various embodiments, the wearable device 222 can include or comprise a wearable beacon 226, such as to provide location information about the position of the wearer of the wearable device 222, such as by detecting proximity to one or more points of interest (such as by detecting or interacting with wireless infrastructure capabilities of the venue that are known to be located at the points of interest via NFC, Bluetooth™, Bluetooth™ Low Energy (BTLE), WiFi, iBeacon, or other wireless signals, or other location methods, such as cellular triangulation, GPS, dead reckoning, user reporting of location, etc.). The wearable device 222 can connect to or interact with the mobile device 220 and one or more itineraries 228 (such as to receive information about current and upcoming itinerary items, such as the nature of the items, locations, times and routing information within the venue to the next or subsequent item, as well as to receive information about entitlements, such as tickets, that may be used, via the wearable device 222, in connection with items on the itinerary). The EaaS platform 230 can include or connect to a reporting and analytics facility 232, which may take information from various components of the EaaS platform 230, or other elements that interact with the EaaS platform 230 and allow the generation of reports and analytic results on the data, such as information about what experiences have been recommended, what experiences have been undertaken by users, what entitlements have been redeemed, what goods or services have been purchased, what profits have been made, and the like, in each case optionally presented by time period, by location, by visitor, by group, by demographic factor, and by many other variables. The analytics facility 232 may thus allow users, such as marketing staff of a host, to analyze the impact of any of the factors captured in the various data sets used by the EaaS platform 230 that may contribute to creation, recommendation, assembly, delivery, and completion of experiences, as measured by contribution of the factors any of a wide variety of measures of performance (e.g., number of visits, duration of visits, frequency of visit, visitor satisfaction ratings, profit per visitor, profit per time period, gross sales, net sales, gross profits, net profits, amounts paid by sponsors, rates paid by sponsors for sponsorship, and many other). Analytics may include visualizations, such as heat maps, as well as presentations of results as an overlay on the dynamic venue map, such as showing which attractions or points of interest are most popular, most profitable, or the like. The analytics facility 232 may include capabilities for undertaking a wide range of analytic techniques, including A/B testing techniques, correlation analysis (including use of similarity matrices, such as for collaborative filtering, as well as various known statistical techniques), analysis based on distributions (e.g., normal distributions), probabilistic analysis (e.g., random walk and similar algorithms), and many others. Output and results from the analytics facility 232 may be used to optimize recommendations, to suggest new experiences, to improve performance of staff, to improve selection of inventory, to optimize patterns of traffic within a venue, to improve profits and yield, and for many other purposes.

Recommendations of experiences or points of interest (POI) may be made based on user's location, on estimated time for the user to travel to the point of interest, on wait times at the point of interest, on queue lengths at the point of interest, on popularity of the experience/POI, on the user never having been to the experience/POI before, on the user having been to the experience/POI more than a predetermined number of times already (indicating that the user likes the experience/POI), on expected weather at the point of interest, on the experience or point of interest being related to something that the user likes according to profile information concerning the user, on the experience or point of interest being unrelated to something that the user dislikes according to profile information concerning the user, on the type of experience/POI, on an amount of time since the was last at an experience/POI of the same type exceeding a predetermined period of time, on inventory at the POI, or some combination thereof. Recommendations of experiences and related points of interest may be made based on such information concerning more than one user as well, so that when a family is traveling together, for example, the likes and dislikes of each member of the family (and other information as discussed above concerning each member of the family) can be taken into account to find optimal recommendations of experiences and points of interest.

A user's experience can importantly include experience with a particular venue, or a particular type of venue. For example, the user profile can accumulate, and reflect, the user's experience with a theme park, with theme parks of a particular type, with a cruise ship, with visits to locations within venues or around the world, and the like. Among other things, the user experience can keep track of what a user has done during past visits, including capturing positive and negative ratings, so that positive past experiences can be added to an itinerary or recommended at appropriate times during a subsequent visit, or so that similar experiences can be recommended or added to an itinerary at a new venue. The user experience can also capture information about a current visit, such as indicating that a user has already experienced a certain attraction, event, service, or the like, so that the EaaS platform 230 can steer the user to additional experiences or re-direct the user to favorite experiences at appropriate times.

The user profile can also account for user interests, including interests in particular types of dining, foods or beverages, interests in entertainment options (such as preferences in music, dancing, magic shows, animal shows, and many others), interests in attractions (such as thrill rides, water rides, arts, fireworks, fountains, historical information, and many others), interests in particular characters, people or topics, and many others. These can be used, for example, to identify relevant attractions that are either directly responsive to the user's interests or that have been given positive ratings by similar users. Interests can also be inferred, such as by identifying interests of other users who have similar characteristics.

The EaaS platform 230 may include an assembly layer 234, and an experience generator 236. The assembly layer 234 may be used to assemble an experience, such as by assembling various components that comprise the experience, such as content (such as messaging and communications, recommendations, and the like, including multimedia content, branded content, logos, and the like that may present aspects of the experience), entitlements (such as tickets, reservations, coupons, discounts, passes (including line skipping passes) and the like, as well as bar codes, QR codes, or other information needed to redeem an entitlement or undertake an experience), information about goods and services (such as packages of foods and beverages that can be ready for the visitor upon arrival), itinerary information (such as indicating time and place for the experience, wait time information, and the like), directional or navigation information, pricing information, and the like. The assembly layer 234 may include user interfaces for a human user to assemble an experience, such as by authoring messages, selecting elements of an experience (including by menus, by drag-and-drop interfaces that allow the user to pull items from libraries or database, and the like), setting parameters for the experience (such as pricing and discounts, timing factors (such as how long a discount is available), and the like. The assembly layer 234 may also include semi-automated, or entirely machine-based assembly of experiences. For example, a machine learning capability of the assembly layer may use a training set of assembled experiences as a basis for assembling (optionally under human supervision or with human confirmation) additional experiences that are similar to the ones created in the training set. Over time, the machine-based experience assembly capability may use feedback (such as based on metrics indicating satisfaction by visitors with assembled experiences or indicating profitability or per-visitor yield for experiences) to improve the capacity of the assembly layer 234 to assembly highly effective experiences. The assembly layer 234 may also embody rules, such from a rules engine 245, such as to mandate certain aspects of assembly of experiences or to preclude certain aspects of the assembly; for example, a rule might indicate that "no experience for a minor should include alcoholic beverages" or "all experiences between noon and 2:00 p.m. should include food and beverage recommendations." Thus, through a combination of human creation, machine-automation and application of rules, the assembly layer 234 allows the assembly of an experience. The experience generator 236 may take the experience assembled by the assembly layer 234 and generate a data structure reflecting the actual experience, such as generating a message, with appropriate codes for redemption, entitlements, and the like, for delivery such as to the visitor's mobile device or wearable device, and/or for delivery to a point of sale, such as for use by staff of the host.

The EaaS platform 230 can also include or connect to a physical world content management system 238, which may be used to manage various content that is used to design, create, assemble, deliver, and recommend experiences, such as multimedia content from various content libraries (e.g., branded content about products and services, attractions and the like, video content about experiences, map content, content about points of interest (including location data, opening hours, mapping of infrastructure elements, such as beacons and displays, etc.)), as well as information about visitors (such as user profile information as discussed in more detail below), information about other factors that can impact an experience (such as weather information), information about a venue (such as about available infrastructure, inventory, and the like), information about the host, information about parameters of experiences (such as pricing, discounts, inventory levels, wait times, restrictions, prohibitions, and the like), and many other types of content. The physical world content management system 238 is described in more detail elsewhere in this disclosure. The EaaS platform 230 may also include a recommendation engine 240 for recommending experiences or points of interest (POI) or aspects of experiences, either directly to a visitor or to personnel of a host, such as to assist in assembling experiences or to assist staff in guiding visitors to favorable experiences. The recommendation engine 240 is also described in more detail elsewhere in this disclosure. The EaaS platform 230 may also create, manage, and consume information from various user profiles/identities 242, each of which may contain various identity, demographic, psychographic, geographic, historical, transactional, relational, social, personality, or other information that may indicate a user's likely preferences, relationships (such as membership in a family social group, business group, or other group), or the like. In the context herein, the term "user" may refer to a venue attendee or a user of a particular mobile/wearable device 110 and/or front-end device 135. The EaaS platform 230 can further include, connect to, or integrate with a context engine 243, which may be used to determine the context of a visitor at a given time and place, such as taking into account the visitor's identity, the time of day, the season, the weather, the presence or proximity of various physical world elements (such as points of interest, displays, and infrastructure elements), the presence or proximity of other individuals (such as members of a family or social group, or the like), the visitor's history (such as recent activities or transactions, or longer-term activities that may indicate an interest in a type of activity), a visitor's current state (such as a level of energy or fatigue such as indicated by past activity (such as participation in physical exertion during hot weather)) or by tracking (such as by a wearable activity monitor) or a current mood (such as indicated by user survey), or by an indicator (such as from a physiological monitor or facial recognition facility), or the like, or any of a wide variety of other elements that reflect the state or context of the visitor. The context engine 243 may include automated elements, such as a machine learning facility, for automatically determining, or predicting, a user's context, which may optionally be trained via a human-generated training set and optimized based on feedback, such as indicators of the actual context of a visitor or indicators of particular factors used to determine that context. For example, visitors might provide feedback about energy levels, mood, or interest that may be used to refine machine-learning models that infer such factors based on other factors, such as time of day, weather, the consumption foods, and the like. Output from the context engine 243 may be provided to other aspects of the EaaS platform 230, such as the assembly layer, the experience generator, the SDK, the development application, and the like, so that experiences can be created that are appropriate for the context of a particular visitor or group.

The EaaS platform 230 may also include a sales activation engine 244, which may be used to assist personnel of the host in activating sales of goods and services that may be offered as part of or in conjunction with an experience. The sales activation engine 244 may take data from, for example, an inventory system, so that a user of the sales activation engine 244 may be aware of what goods and services are in stock and at what levels, which goods and services need to be promoted (to maintain appropriate inventory levels), which ones are most complementary to each other and to particular experiences or aspects of experiences, which ones are most profitable, and the like. A dashboard or interface of the sales activation engine 244 may allow personnel to determine what items should be promoted given the current context of a visitor, including the identity information, location, time of day, and other information and may suggest assembly of an overall experience that is most likely to promote sales (and a high yield or profit). For example, a person who has just waited in a long line on a hot day to participate in a thrill ride may be offered a discounted favorite cold beverage (such as based on past beverage purposes) at nearby point of interest, packaged with a recommendation for an experience that takes place there in an air conditioned environment. Embodiments of the sales activation engine 244 may include automation, including machine learning, to automate the recommendation or assembly of items for sale, such as by using a training set that is created by human personnel and subsequently optimized based on feedback metrics, such as metrics on actual sales of goods and services, metrics on profitability, and the like. Rules from the rules engine 245 may be used to govern the use of the sales activation engine 244, such as rules prohibiting certain types of sales activation (e.g., "do not run more than 5 sales promotions per visitor per day" or "promote item X to all visitors today"). Output from the sales activation engine 244 may include direct messages to visitors promoting items, as well as content for the assembly layer 234, such as content indicating what goods or services should be packaged or promoted with a recommended experience.

As noted, the EaaS platform 230 may make use of rules, including business rules, in various components and methods described throughout this disclosure. Rules, such as business rules, may be developed, maintained and distributed using the rules engine 245. Rules may be used to govern human-performed activities, such as ones used in various interfaces and dashboards to create, recommend, assemble, deliver and manage experiences, as well as to govern automated activities, such as similar ones performed based on machine learning.

The EaaS platform 230 can also connect to a beacon system 246, which may be associated with a location database 248, such that locations of beacons 246 at various points of interest in a location can be known to the EaaS platform 230, such as for use by humans, by machine-based automation or combination, as a basis for knowing where points of interest are and where other items (including detected items, such mobile devices, wearable devices, and the like) are relative to the points of interest. The location database 248 may include locations of beacons, points of interest, inventory items, infrastructure elements (including communications infrastructure, media infrastructure, display infrastructure, facilities and the like), and the like. The location database 248 may include source information for use by various layers of the dynamic venue map as described in detail elsewhere in this disclosure.

The EaaS platform 230 may also include the EaaS SDK 250, which may comprise a set of software tools, components, modules, libraries, and the like for using the various aspects of the EaaS platform 230, such as for taking outputs from and providing inputs to the context engine, the rules engine, the location database, the assembly layer, the experience generator, the recommendation engine, and other elements. This may include various interfaces and similar elements for connecting to the EaaS platform 230 and its components, including APIs, connectors, gateways, buses, bridges, message brokers, hubs and the like. The SDK may be used to create, assemble, deliver, and manage experiences, as well as to manage and use aspects of the EaaS platform 230.

The EaaS platform 230 can connect to and use the itineraries 228, such as to provide experiences to be included in an itinerary and to take itinerary information as an input, such as to determine a next message to provide to a user. Itineraries 228 are described in more detail elsewhere in this disclosure.

The EaaS platform 230 may interact with a mobile device 220 of a visitor or personnel of a host, such as for delivering messages and other content, delivering entitlements, redeeming entitlements, tracking user location, delivering sponsored content, and the like.

The EaaS platform 230 may use and integrate the dynamic venue map 202, such as presenting the map on a user device to show the venue, to guide visitors to experiences, to show content about points of interest, to show offers or promotions, to show sponsored content, or the like. The dynamic venue map 202 may also be used as an interface for experience developers, such as using the SDK or the development application, where staff of a host may see where a visitor is located, see nearby points of interest, see inventory levels and the like, to help a staff member determine an experience to recommend or provide information to a visitor about an available experience. The dynamic venue map 202 may also be used for analytics, such as showing reports on various metrics that are associated with points of interest at a location such as numbers of visits, sales levels, yields per visitor, inventory levels, profitability, and many others.

The EaaS platform 230 can also connect to the location systems infrastructure 204, such as to obtain current location data, such as the number of visitors detected in proximity to points of interest, and the like. An analytics API 256 of the EaaS platform 230 may provide access to various data from any of the components of the platform 230 for purposes of analytics, including the analytics facility described elsewhere in this disclosure and third party analytics facilities that may use the API to obtain information from the EaaS platform 230. The EaaS platform 230 may include a user interface, such as a corporate viewer user interface (UI) 254, which may comprise a user interface by which staff, such as executive staff of a host, may see data about various aspects of the EaaS platform 230, including metrics on experiences, visitors, visits, yields, and the like.

In embodiments, the analytics API 256 can connect to the EaaS platform 230. The analytics API 256 can also connect to the EaaS Platform 230 through the reporting and analytics facility 232. The corporate viewer UI 254 can connect to the EaaS platform 230. In further aspects, the corporate viewer UI 254 can connect to the EaaS Platform 230 and make use of the reporting and analytics module 232.

Recommendations can also include coupons and promotions, sponsored content, and the like. Available experiences can be delivered by optional push notifications or can be made available to be pulled, such as by interactions with a dynamic venue map 202, by searching (such as using a mobile device), or the like. Recommendations can be sent by server 125 to a staff member or to the guest. Recommendations can be integrated into a personalized itinerary before being sent by server 125 to a staff member or to the guest, the personalized itinerary optionally including other experiences or POIs besides the experiences or POIs recommended by the EaaS platform 230. Recommendations may also be based on similarity or dissimilarity to other experiences or POIs in the personalized itinerary, such as experiences or POIs that were personally selected by the user to whom the itinerary is personalized.

Figure 3:
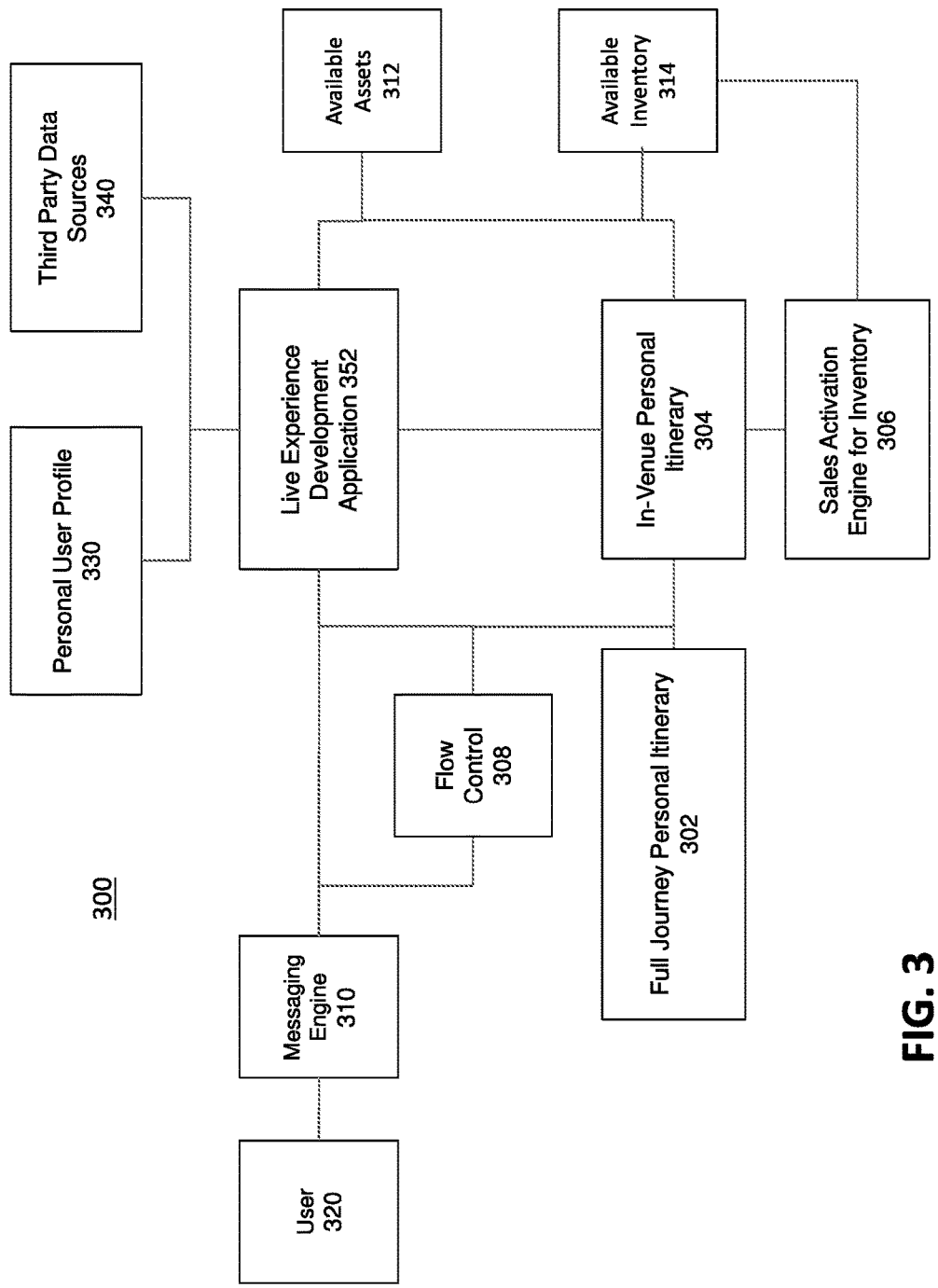
FIG. 3 illustrates information flow for real-time management of experiences and personalized itineraries.

FIG. 3 illustrates information flow for real-time management of experiences and personalized itineraries. The information flow 300 of FIG. 3 more specifically shows connections (each optionally bidirectional) between different types and/or sources of information that ultimately are used to produce a personalized itinerary 302/304 for a user 320. In relation to FIG. 1, any of the sources of information 140 discussed with respect to FIG. 3 may be among any of data source(s) 105 identified in FIG. 1 and/or may be stored at the app server(s) 125 itself.

The EaaS platform 130, in the context of FIG. 3, can create and manage an itinerary 302/304 for a user. The itinerary 302 can be for a full journey for a user within a venue, such as from a point of origin (e.g., at home), to one or more locations/areas/venues (such as to a series of cities on a trip, a series of islands or ports on a cruise as in FIG. 5 or FIG. 6, or the like) and points of interest or sub-venues along the way (such as theme parks, ships, aircraft, ports, stores, malls, restaurants, bars, and many others). For each venue or sub-venue, an in-venue itinerary 304 can be generated, which in examples can be a highly personalized personal itinerary 304 that is generated based on the user profile 330 that may identify likes and dislikes and location histories of a user 320, as well as based on other information, such as from various third party data sources 340, which can include information about entitlements (such as tickets the user can have already obtained to particular attractions or events, reservations the user can have already made, and the like), information about expressed preferences, interests, or plans, information about climate and weather, and many other items. Third party data sources 340 may include social media profiles corresponding to users/attendees 320. Third party data sources 340 may be part of the personal user profile 330, though they are illustrated separately in FIG. 3.

In examples, a live experience development application 352 can be used to generate an in-venue personal itinerary 304 for the part of the itinerary 302 that is associated with a visit to a particular venue. In addition to using the user profile information 330 (which, as noted in this disclosure, can account for relationships and connections with a group, such that an itinerary for a user can be associated with, and managed in connection with, a larger group itinerary) and other information about the full journey itinerary 302, the in-venue personal itinerary 304 can be dynamically created and account for other factors, such as current wait times and crowds (including adjusting the itinerary 304 for flow control 308, so that users within a venue are spread smoothly across attractions, while still satisfying personal needs and goals).

The itinerary 304 can also be repeatedly updated based on available assets 312 (such as what attractions are open and have reasonable wait times in the proximity of the user at a given time), the user's current state (such as whether the user expresses hunger, thirst, fatigue, or the like, or such factors are inferred based on history), information about the user's group (such as locations and itineraries of the group), recommendations for the user (such as described in connection with the recommendation engine, including appropriate recommendations for the immediate time and location as well as recommendations for later experiences. The itineraries 302 and 304 can be delivered and updated by the messaging engine 310, such as by text or voice messages to the user's mobile phone or wearable device, as well as by presentation of information on the live, branded, dynamic venue map. For example, an itinerary can be shown on a map with the current location and currently recommended item highlighted (such as in a color, with flashing symbols, or the like), and one or more alternative future recommendations shown, with routing information (including alternative available routes and itineraries) for the user.

The itinerary can show optional items as well as mandatory items (such as the designated meetup location for a group). The EaaS platform 130, such as using the live experience development application 352 or automatically, such as by machine learning, can constantly update the itinerary, such as accounting for changes. Changes can include the user having more time, because an attraction took less time than expected, or vice versa, or the user deciding to take a different route or do something different than was previously anticipated in the itinerary 306. Changes can include changes in the inventory of tickets, goods, services, or the like near the user's location or at other locations that are later in the itinerary. Changes can include changes in wait times. Changes can include changes in the user's state, such as becoming tired, hungry, thirsty, or bored. Changes can include changes in itineraries for the user's group, changes in locations for members of the group, or the like. In each case, updated information can be used to suggest a new itinerary that accounts for the current state of the user and the venue.

In many aspects, the EaaS platform 130 can track completion of experiences for an itinerary, such as by receiving location signals (such as an indication that a user's mobile phone or wearable device has entered the proximity of a beacon that is positioned at a point of interest), by receiving evidence of redemption of entitlements (such as redemption of tickets, including electronic tickets, or redemption of credits, such as stored on a mobile device or wearable), and receiving evidence of purchases or consumption (such as indicated by transaction data or other information from points of purchase located within a venue). Completed experiences can be recorded on the itinerary, prompting directions (such as messages or elements on a map, such as routing information) for the next itinerary item, allowing the progression through a series of locations, points of interest and the like on the itinerary. As noted, changes in the venue, in the user's state, and other factors can lead to changes in the itinerary, which can be managed automatically in the platform, can be managed by the user (such as by setting or approving items on the user's mobile phone), and can be managed for the user by the experience provider, such as using the live experience development application 352.

In an example, a father and son are visiting a theme park. The live experience development application 352 is used to generate a full journey personal itinerary 302 for the father to follow during the visit. The full journey personal itinerary 302 includes recommendations based on the personal user profiles 330 of the father and of the son.

For example, the personal user profiles 330 of the father and of the son indicate the father-son relationship. The personal user profile 330 of the son indicates the son prefers to ride roller coasters, ride Ferris wheels and eat pizza. The personal user profile 330 of the father indicates the father has no ride preferences and prefers healthy eating options.

The full journey personal itinerary 302 is also developed using data from third party data sources 340. For example, the father would like to minimize the cost of the trip and asked a question on a social network about how to minimize costs during a trip to a theme park. This question is used to signal to the live experience development application 352 to include special deals and offers in the full journey personal itinerary 302. Such information may alternately be included in the father's user profile.

When in a group, all of this information concerning both the father and the son may be used to generate recommendations for experiences and/or points of interest (POIs). For example, the son's preference for pizza and the father's preference for healthy eating options may result in a recommendation for a restaurant that provides both pizza and healthy eating options. The son's preference for roller coasters and ferris wheels combined with the father's preference for minimizing costs of the trip may result in a recommendation for the lowest-cost roller coaster or ferris wheel rides. This may be combined with locations of the father and son so as to recommend POIs that are near both the father and the son or along a route that they are known to be using based on other POIs (such as self-selected POIs) in their group itinerary or separate respective itineraries.

Figure 4:
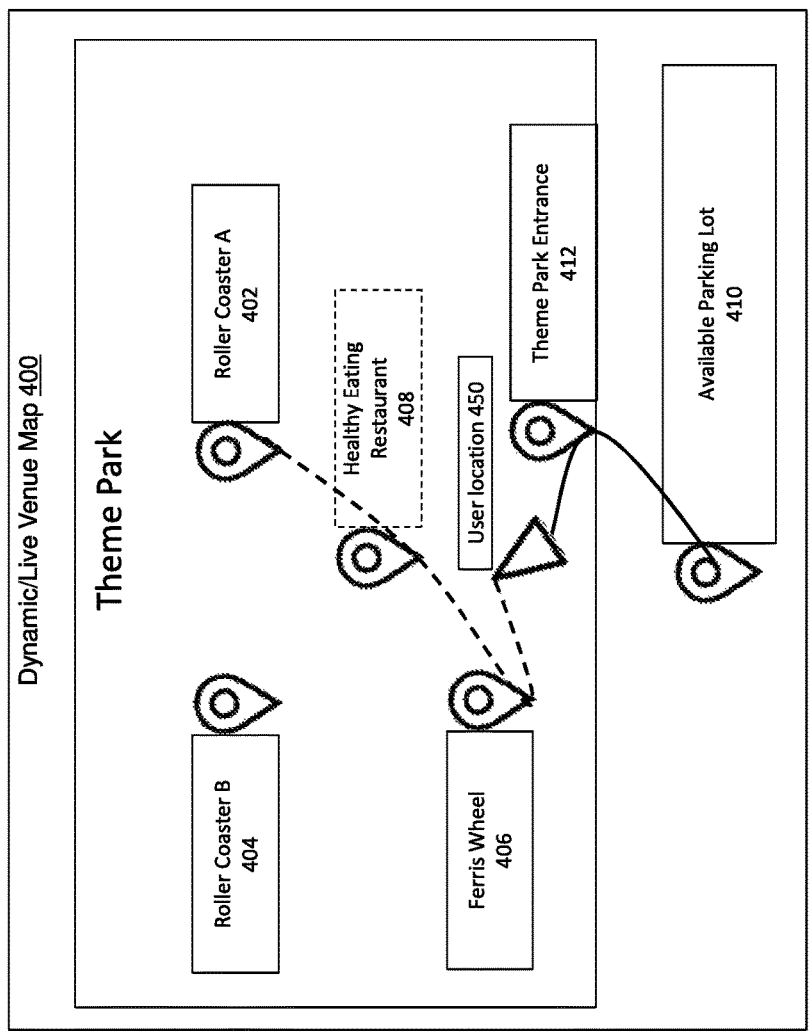
FIG. 4 illustrates a dynamic live venue map identifying a personalized itinerary in a theme park venue.

FIG. 4 illustrates a dynamic live venue map identifying a personalized itinerary in a theme park venue. The dynamic live venue map 400 of FIG. 4 may be one implementation of a dynamic venue map 202 as discussed with respect to FIG. 2 and/or a personalized itinerary 302/304 as discussed with respect to FIG. 3.

Available assets 312 in the context of FIG. 4 indicate there are two roller coasters (roller coaster A 402 and roller coaster B 404), a Ferris wheel 406, a healthy eating restaurant 408, a theme park entrance 412, and a parking lot 410 available at the theme park. The user's location 450 is marked on the map, with a solid line indicating that the user has traveled from the parking lot 410 to the theme park entrance 412 and is now standing between the theme park entrance 412 and the Ferris wheel 406. The Ferris wheel 406, the healthy eating restaurant 408 (optionally if the user is hungry as marked using a dashed box), and the Roller coaster A 402 are included on the full journey personal itinerary 302 of FIG. 4. Available inventory 314 indicates the ingredients for salads at a healthy eating restaurant 408 are nearing the end of their shelf life, and this inventory information can be a component in recommending or not recommending the healthy eating restaurant 408. The healthy eating restaurant 408 is also included on the full journey personal itinerary 302 of FIG. 4 for at least this reason.

Presentation layer development can include the use of a dynamic/live venue map 400. The dynamic/live venue map 400 can include point of interest (POI) locations 404, 402, 406, 408, 410, 412, which can be dynamically updated based on changes occurring within a venue or managed location. In many aspects, wait time can be an example of point of interest data or metadata associated with a location or point on the dynamic map. By way of this example, the point of interest data or map point metadata for one or more destinations can be pulled and updated among the users. In these examples, the point of interest data or map point metadata can include menu data for the restaurant, wait times for many points of interest at a managed location, or the like.

The personalized itinerary map of FIG. 4 may include recommendations for and based on two users, to relate FIG. 4 back to the father/son example discussed with respect to FIG. 3. The full journey personal itinerary 302 is sent prior to the visit via the messaging engine 310 to the visitor device/wearable 110 of the father, which is acting as a front-end device 135 in the context of FIG. 1. The full journey personal itinerary 302 can stretch back before arrival at the venue (the theme park) to also include directions to the theme park from the father's and son's home, as well as parking information. Parking information is updated based on the available inventory 314 of parking. This guides the father and son to an available parking lot 410, minimizing time they have to spend searching for an available parking space.

The EaaS platform 130 detects when the father and son enter the theme park, by detecting that a beacon on the mobile phone of the father has entered the boundaries of the theme park. An in-venue personal itinerary 304 is sent to the mobile phone of the father when the EaaS platform 130 detects the father and son have entered the theme park.

The in-venue personal itinerary 304 includes a dynamic/live venue map 400. In this example, roller coaster A 402, roller coaster B 404, Ferris wheel 406 and healthy eating restaurant 408 are displayed as POI locations on the dynamic/live venue map 400.

The in-venue personal itinerary 304 suggests that the father and son ride roller coaster A 402 first, since roller coaster A is located close to the theme park entrance 412. Because it is before noon, the in-venue personal itinerary 304 suggests the father and son ride roller coaster B 404 second, before having lunch.

After riding roller coaster A 402, the father indicates in his user state (which may be part of the user profile information) that the father and son are hungry. Alternately, the EaaS platform may deduce that the father and son are likely hungry based on a time since they were last at a food establishment exceeding a predetermined amount of time (e.g, 3 hours). Based on this indication, a healthy eating restaurant 408 located in close proximity to the exit of Ferris Wheel 406 is displayed as a dynamic map location 408 on dynamic/live venue map 400.

The healthy eating restaurant 408 also serves salads. Because the ingredients used to make salads are near the end of their shelf life, a buy-one-get-one-free salad offer is generated. Healthy eating restaurant 408 is then highlighted on the dynamic/live venue map 400, indicating a deal on salads is available. The father chooses the healthy eating restaurant 408 for him and his son to have lunch and orders salads for both of them, redeeming the buy-one-get-one-free salad offer.

In one example, the father and son may have had plans to ride roller coaster B 404 after lunch. The EaaS platform 130 used wait time data or queue length data from information 140 (as discussed with respect to FIG. 1) to detect that wait time at the Roller Coaster A 402 was short (or zero), while wait time at roller coaster B 404 was significant (e.g., exceeding a predetermined duration of time), indicating a shorter line at the Roller Coaster A 402 than at the Roller Coaster B 404, as the father and son were finishing lunch. As the father and son were finishing lunch, the dynamic map location of the Roller Coaster A 402 on the dynamic/live venue map 400 turned green, indicating there was no line at the Roller Coaster A 402. Since there was no line at the Ferris wheel 406, the father and son decided to ride the Roller Coaster A 402 after lunch, rather than ride roller coaster B 404.

With reference to FIG. 2, the present teachings generally include real time management of highly personalized experiences of customers, their families, traveling companions or the like. The real time management of highly personalized experiences at managed locations can be integrated into many of the operations and offerings at the managed locations. The operations and offerings at the managed locations can include events and entertainment offerings, but also includes fare offered by the location, and transport to and from the managed locations. With regard to transport to and from the managed locations, the real time management of highly personalized experiences of customers can coordinate the managed location to guide patrons to proper surface parking, garages, parking trams, or other forms of transportation that can be used.

The real time management of highly personalized experiences of customers can connect to the computing devices of the customers and their family members, as well as computing devices of the host and its personnel, including staff at the venue and personal located remote from the venue. The computing devices can include phones, tablets, watches, wearable devices (including ones dedicated to use at the venue), augmented reality or virtual reality glasses, as well as laptop and desktop computers, servers, and the like. In connecting to the computing devices of customers, cellular network and cloud network facilities can be employed to ensure interconnection. The real time management of highly personalized experiences of customers can also connect with sponsors (such as advertisers) so as to be able to provide sponsored content to the customers at the managed locations. The sponsored content can be related in real-time to what is occurring with the user and/or the family of the user, their itinerary, the time of day and many factors relating to placement of sponsored content.

Figure 5:
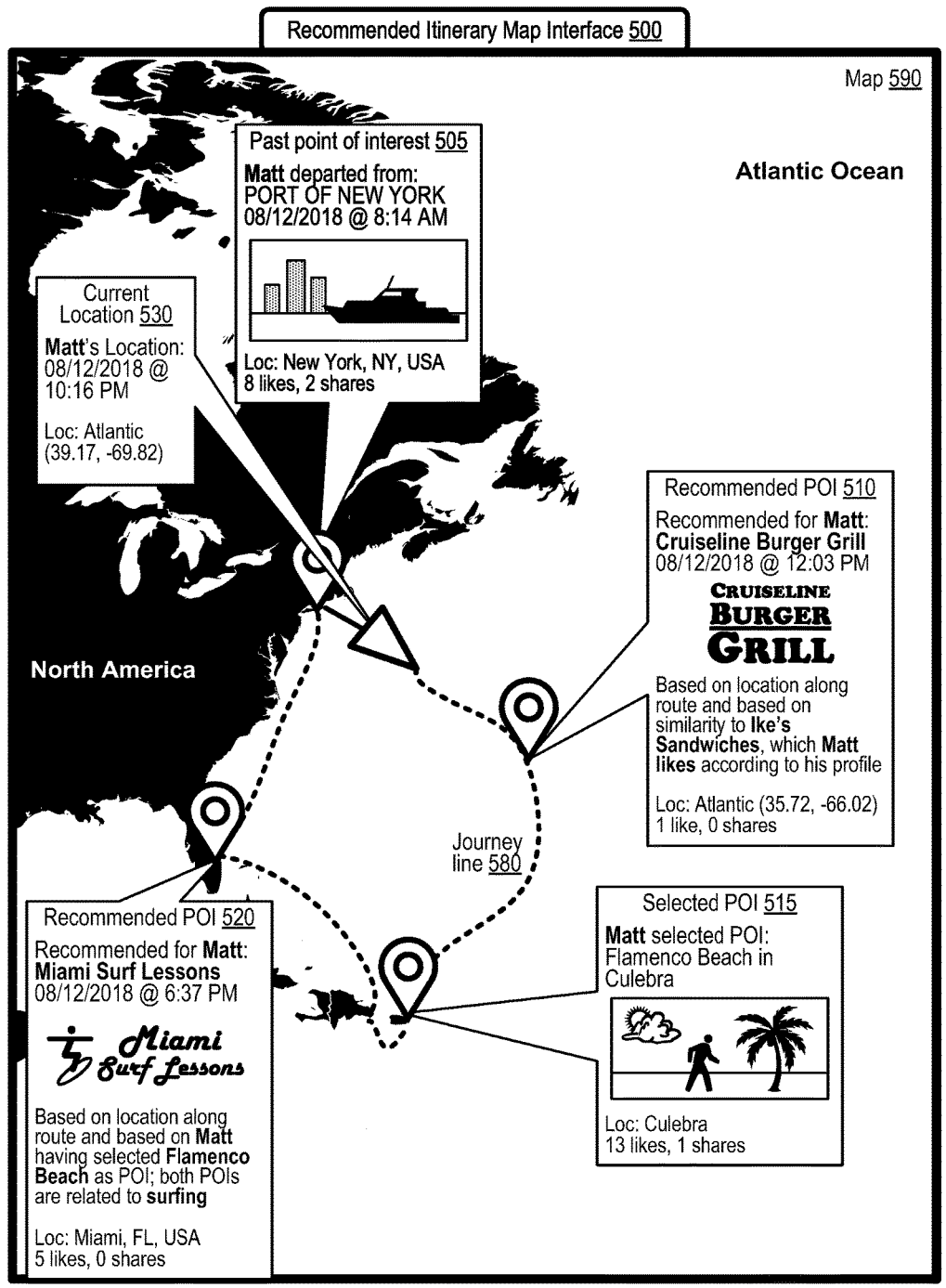
FIG. 5 illustrates a recommended itinerary map interface for a single user.

FIG. 5 illustrates a recommended itinerary map interface for a single user. The recommended itinerary map interface 500 of FIG. 5 may be one implementation of a dynamic venue map 202 as discussed with respect to FIG. 2 and/or a personalized itinerary 302/304 as discussed with respect to FIG. 3. In particular, the recommended itinerary map interface 500 of FIG. 5 maps a personalized itinerary including recommended POIs and user-selected POIs for a user "Matt" within a map 590 of a venue selected to be Eastern North America.

The recommended itinerary map interface 500 of FIG. 5 identifies a past POI 505 as the port of New York, which the user "Matt" was at previously. A first recommended POI 510 is provided by the EaaS platform 230 as "Cruiseline Burger Grill." The recommended POI 510 is recommended based on its location being along an existing route (from the user's current location 530 to selected POI 515) and based on similarity to something that the user "Matt" likes according to his user profile ("Ike's Sadwiches"). A second POI 515 along the personalized itinerary is user-selected—Flamenco Beach in Culebra. A third POI 520 along the personalized itinerary is recommended by the EaaS platform 230 as "Miami Surf Lessons" based on its location being along an existing route (from the user-selected POI 515 back to the port of New York 505) and based on similarity to the user-selected POI 515 (Flamenco Beach in Culebra) in that both POIs are related to surfing.

The resulting map interface 500 illustrates a journey line 580 representing a path connecting the POIs 505, 510, 515, 520, and back to 505, the journey line 580 also connecting the current location 530 of the user. In some cases, a path 580 may be somewhat pre-set, as in a pre-set cruise, in which case recommended POIs may be recommended because they are along that path 580 and one or more additional reasons, such as similarity to "likes" of the user or dissimilarity to "dislikes" of the user or any of the other reasons identified above.

Figure 6:
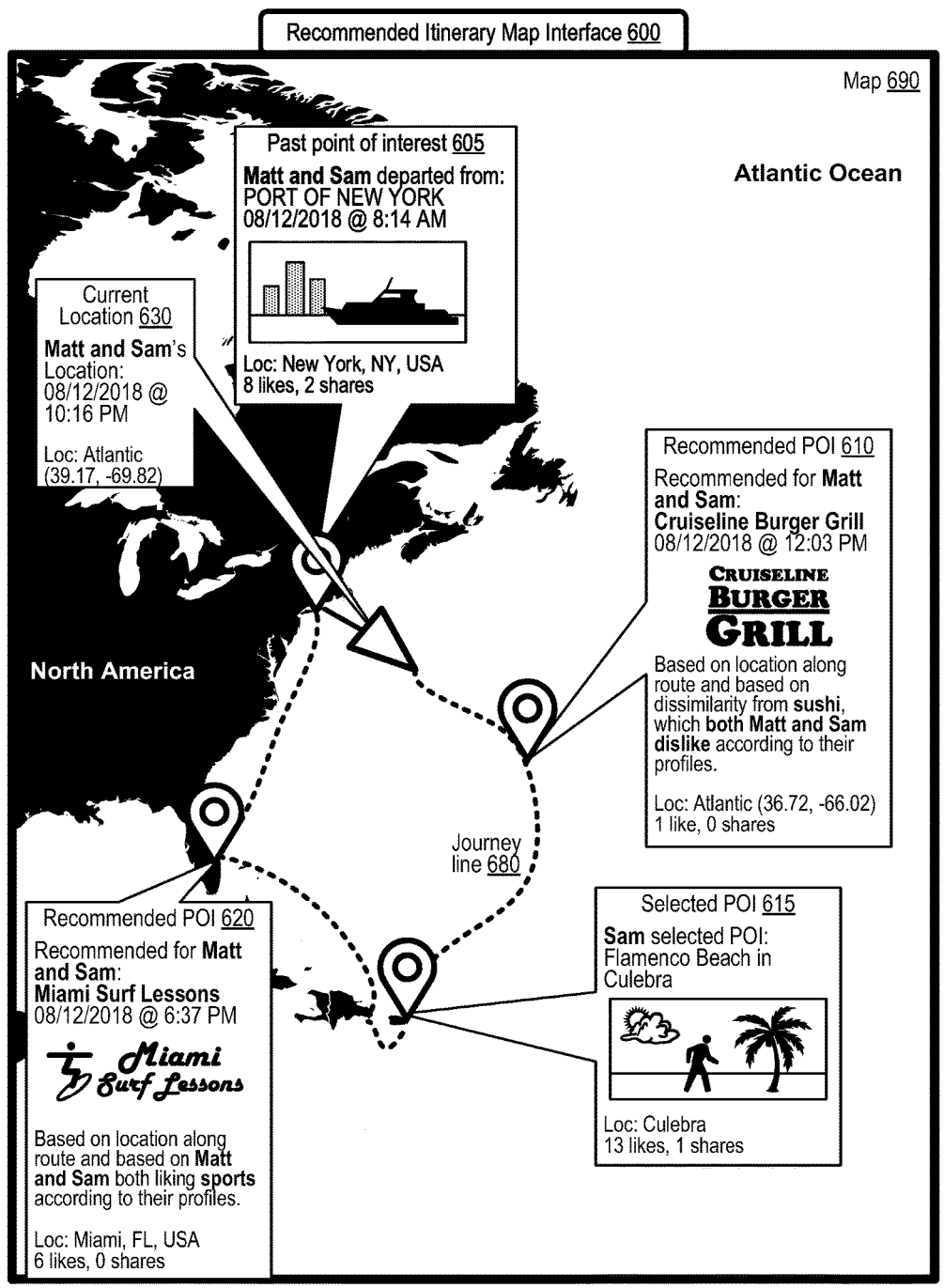
FIG. 6 illustrates a recommended itinerary map interface for two users.

FIG. 6 illustrates a recommended itinerary map interface for two users. The recommended itinerary map interface 600 of FIG. 6 may be one implementation of a dynamic venue map 202 as discussed with respect to FIG. 2 and/or a personalized itinerary 302/304 as discussed with respect to FIG. 3. In particular, the recommended itinerary map interface 600 of FIG. 6 maps a personalized itinerary including recommended POIs and user-selected POIs for two users "Matt" and "Sam" within a map 690 of a venue selected to be Eastern North America.

The recommended itinerary map interface 600 of FIG. 6 identifies a past POI 605 as the port of New York, which the users "Matt" and "Sam" were both at previously. A first recommended POI 610 is provided by the EaaS platform 230 as "Cruiseline Burger Grill." The recommended POI 610 is recommended based on its location being along an existing route (from the current location of both users 630 to selected POI 615) and based on dissimilarity to something that both users ("Matt" and "Sam") dislike according to their respective user profiles (sushi). A second POI 615 along the personalized itinerary is user-selected—Flamenco Beach in Culebra. A third POI 620 along the personalized itinerary is recommended by the EaaS platform 230 as "Miami Surf Lessons" based on its location being along an existing route (from the user-selected POI 615 back to the port of New York 605) and based on similarity to something that both users ("Matt" and "Sam") like according to their respective user profiles (sports).

While the recommended itinerary map interfaces 400, 500, 600, and 1000 of FIG. 4, FIG. 5, FIG. 6, and FIG. 10 respectively, are all maps, it should be understood that a personalized itinerary can take the form of a list of POIs, either in order of when they should be visited or in a different order.

The resulting map interface 600 illustrates a journey line 680 representing a path connecting the POIs 605, 610, 615, 620, and back to 605, the journey line 680 also connecting the current location 630 of the users. In some cases, a path 680 may be somewhat pre-set, as in a pre-set cruise, in which case recommended POIs may be recommended because they are along that path 680 and one or more additional reasons, such as similarity to "likes" of one or more of the users or dissimilarity to "dislikes" of one or more of the users or any of the other reasons identified above.

Figure 7:
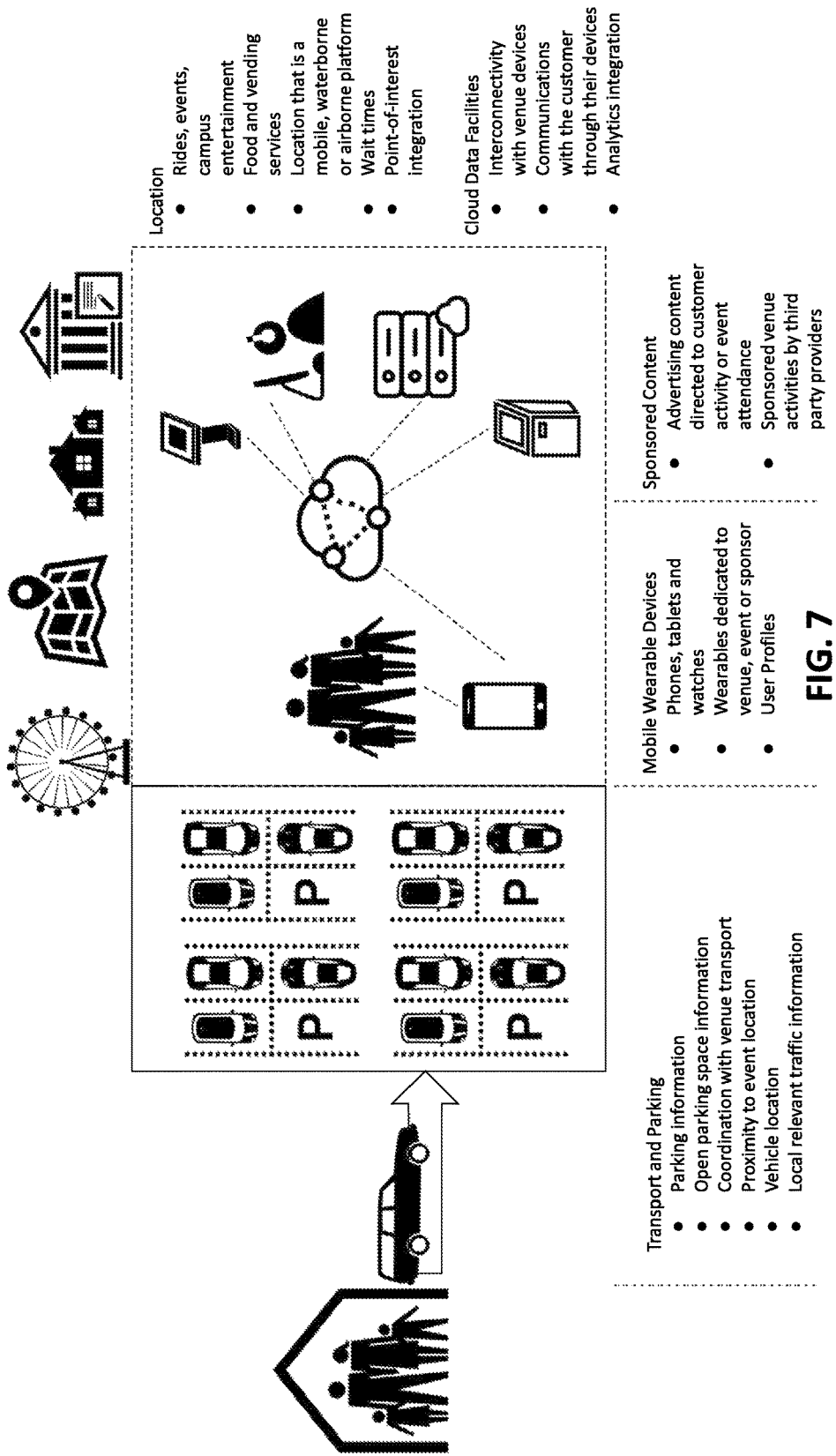
FIG. 7 illustrates delivery of itinerary personalization to users.

FIG. 7 illustrates delivery of itinerary personalization to users.

With reference to FIG. 7, the present teachings generally include real time management of highly personalized experiences of customers, their families, traveling companions or the like. The real time management of highly personalized experiences at managed locations can be integrated into many of the operations and offerings at the managed locations. The operations and offerings at the managed locations can include events and entertainment offerings, but also includes fare offered by the location, and transport to and from the managed locations. With regard to transport to and from the managed locations, the real time management of highly personalized experiences of customers can coordinate the managed location to guide patrons to proper surface parking, garages, parking trams, or other forms of transportation that can be used.

The real time management of highly personalized experiences of customers can connect to the computing devices of the customers and their family members, as well as computing devices of the host and its personnel, including staff at the venue and personal located remote from the venue. The computing devices can include phones, tablets, watches, wearable devices (including ones dedicated to use at the venue), augmented reality or virtual reality glasses, as well as laptop and desktop computers, servers, and the like. In connecting to the computing devices of customers, cellular network and cloud network facilities can be employed to ensure interconnection. The real time management of highly personalized experiences of customers can also connect with sponsors (such as advertisers) so as to be able to provide sponsored content to the customers at the managed locations. The sponsored content can be related in real-time to what is occurring with the user and/or the family of the user, their itinerary, the time of day and many factors relating to placement of sponsored content.

In short, the personalized itineraries 302/304 or maps 202 discussed herein may include recommended POIs based on any of the information discussed in FIG. 7, including for example information concerning transportation method, availability of rides using different transportation methods, scheduled events, campus entertainment, food and vending services inventory, location, wait times, parking locations and availability, open parking space information, coordination with venue transport, proximity to event location, vehicle and/or user and/or mobile device location, local relevant traffic information, advertising content directed to customer or activity or event, sponsored POIs.

Figure 8:
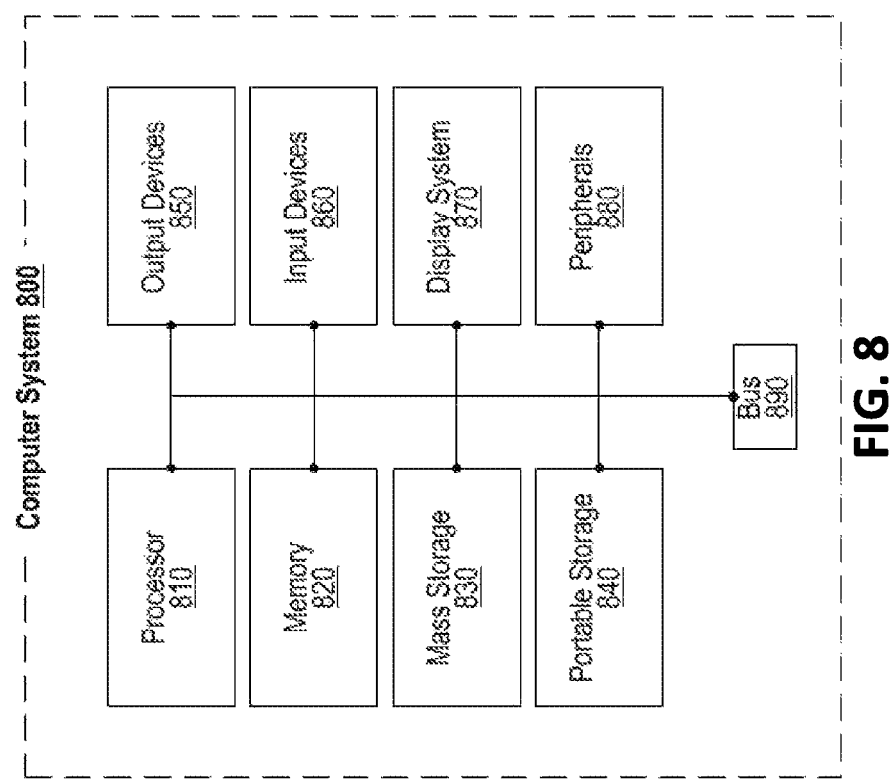
FIG. 8 is a block diagram of an exemplary computing device that may be used to implement the present systems.

FIG. 8 illustrates an exemplary computing system 800 that may be used to implement some aspects of the subject technology. For example, any of the computing devices, computing systems, network devices, network systems, servers, and/or arrangements of circuitry described herein may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage

840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, wired or wireless transmitters, wired or wireless transceivers, or any other components necessary for or usable to implement the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, wired or wireless receivers, wired or wireless transceivers, or any other components necessary for or usable to implement the communication types listed above, such as cellular SIM cards.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 800 of FIG. 8 are those typically found in computer systems that may be suitable for use with some aspects of the subject technology and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 800 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay®/Mastercard®/Visa® (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

Figure 9A:
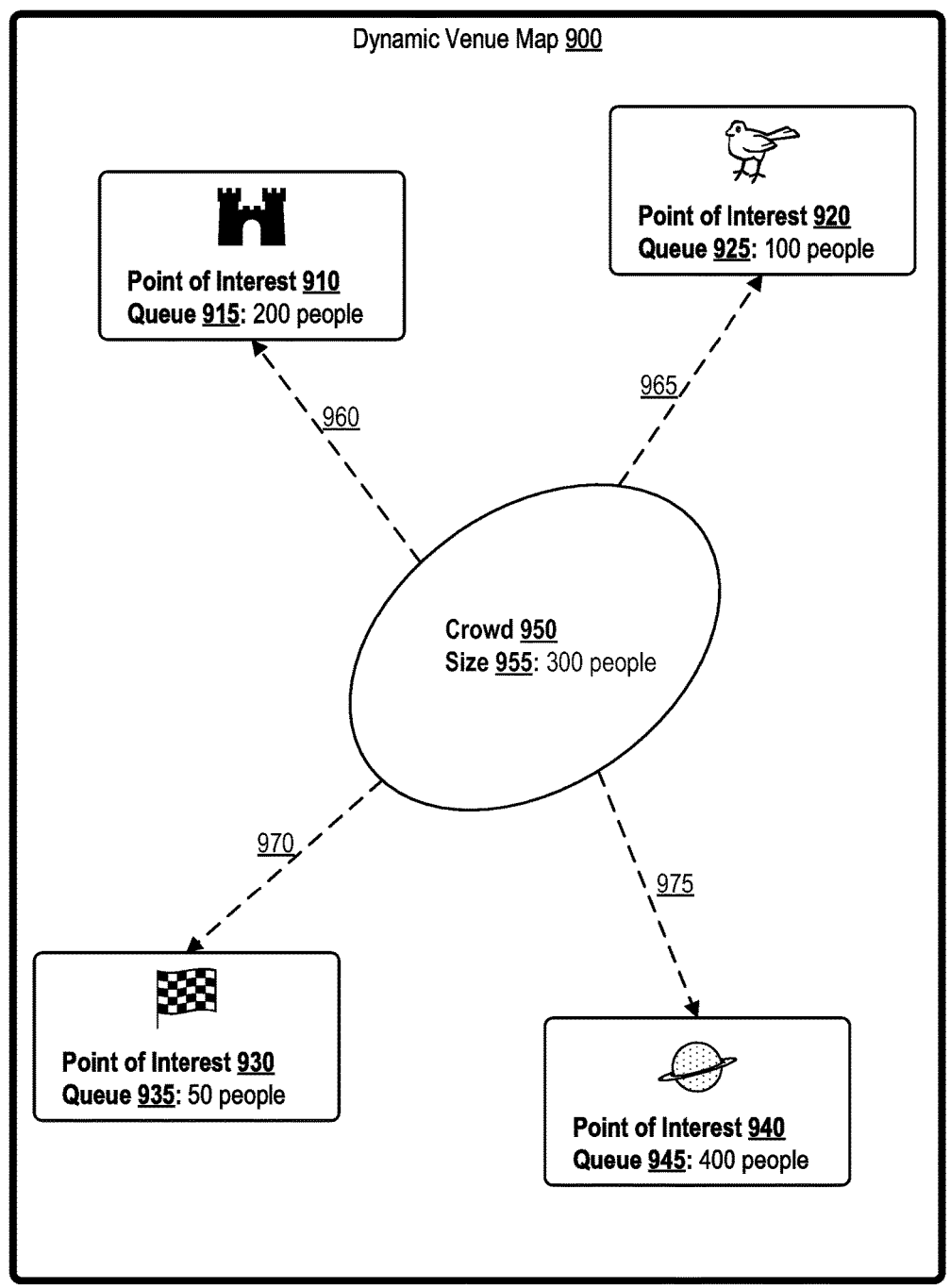
FIG. 9A illustrates a dynamic venue map identifying a crowd and its size along with four points of interest and corresponding queue sizes at each of the points of interest.

FIG. 9A illustrates a dynamic venue map identifying a crowd and its size along with four points of interest and corresponding queue sizes at each of the points of interest.

In particular, the dynamic venue map 900 of FIG. 9A illustrates a crowd 950 of venue attendees, the crowd 950 having a size 955 of 300 people (venue attendees). The four points of interest illustrated in dynamic venue map 900 include a first castle-themed point of interest 910 with a corresponding queue 915 having 200 people (venue attendees), a second animal-themed point of interest 920 with a corresponding queue 925 having 100 people (venue attendees), a third racing-themed point of interest 930 with a corresponding queue 935 having 50 people (venue attendees), and a fourth space-themed point of interest 940 with a corresponding queue 945 having 400 people (venue attendees).

Based on the location of the crowd 950 in between these four points of interest 910, 920, 930, and 940, it is fair to assume that at least a majority of the crowd 950 will end up dispersing to one of the four queues 915, 925, 935, or 945 corresponding to the four points of interest 910, 920, 930, and 940. That is, some of the crowd 950 may head toward the first point of interest 910 and corresponding queue 915 via path 960, some of the crowd 950 may head toward the second point of interest 920 and corresponding queue 925 via path 965, some of the crowd 950 may head toward the third point of interest 930 and corresponding queue 935 via path 970, and some of the crowd 950 may head toward the fourth point of interest 940 and corresponding queue 945 via path 975.

Two main issues arise in terms of how the crowd is likely to disperse along paths 960, 965, 970, and 975. The first is that certain points of interest appear to be more popular than others, as evidenced by the queue 945 corresponding to the fourth point of interest 940 having a queue size of 400 people, more than any other queue pictured in FIG. 9A. If a majority of the crowd 950 simply heads along path 975 to the fourth point of interest 940 and corresponding queue 945, this will lead to the queue 945 becoming extremely long while the other queues remain relatively short, which increases risk of issues at point of interest 940 such as mechanical failures for theme park rides or lack of inventory or seating at a restaurant, bar, or shop. Movement of massive crowds can cause traffic buildups, bottlenecks, and other issues throughout the venue that make the entire venue less efficient and can lead to increased risk along the entire path 975 and its vicinity.

Instead, it would be preferable to direct the crowd 950 to disperse in a way that spreads the members of the crowd 950 to different points of interest, especially those that have shorter lines. This prevents traffic issues throughout the venue and can prevent overuse issues (such as mechanical failure of lack of inventory) at highly popular points of interest and can prevent underuse issues (such as mechanical failure or overabundance of unsold inventory) at less popular points of interest.

Figure 9B:
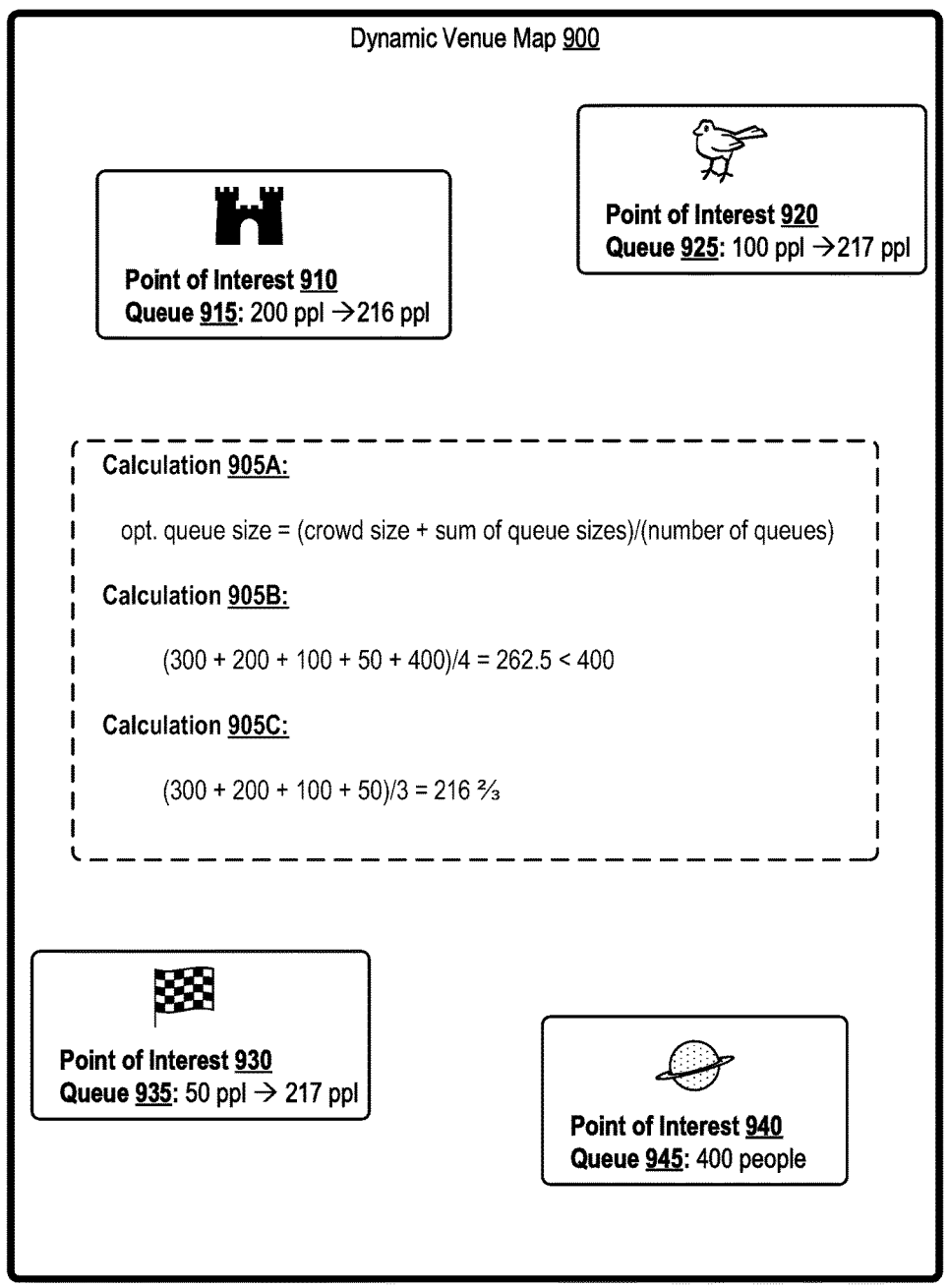
FIG. 9B illustrates the dynamic venue map of FIG. 9A identifying optimal queue sizes following dispersion of the crowd to the different points of interest.

FIG. 9B illustrates the dynamic venue map of FIG. 9A identifying optimal queue sizes following dispersion of the crowd to the different points of interest.

The calculations 905A, 905B, and 905C shown in FIG. 9B identify one way of calculating an optimal queue size for the queues once the crowd 950 of FIG. 9A is dispersed into the queues of FIG. 9A (915, 925, 935, and/or 945) assuming the dispersal is instantaneous—that is, not counting any changes in queue size anticipated in the time it takes for the members of the crowd 950 to reach the various queues along paths 960, 965, 970, and/or 975. These calculation(s) are generally performed by the experience as a service (EaaS) platform 230 of FIG. 2 and/or the app server 125 of FIG. 1.

The first calculation 905A serves is the base equation into which actual numerical values from FIG. 9A are plugged into. The first calculation 905A identifies that the optimal queue size is equal to a ratio, wherein the numerator of the ratio is a sum of the queue sizes at issue added to the crowd size 955 (here, 300 people), and wherein the denominator of the ratio is the number of queues at issue.

The second calculation 905B plugs in the values for all four queues 915, 925, 935, and 945 into the equation of calculation 905A. The resulting calculation is ((300+200+100+50+400)/4)=262.5. Thus, the optimal queue size determined via the second calculation 905B is 262.5 people. However, 262.5 is less than 400, which is the queue size of the fourth queue 945. Since our assumption here is that dispersion is instantaneous and therefore the queue size of the queue 945 will not shrink to 262.5, we try this calculation again in calculation 905C, this time omitting the fourth queue 945 from the calculation.

The third calculation 905C plugs in the values for queues 915, 925, and 935 into the equation of calculation 905A, this time omitting the four queue from consideration both in terms of the queue size in the numerator of the ratio and the number of queues in the denominator of the ratio. The resulting calculation is ((300+200+100+50)/3)=216⅔. Thus, the optimal queue size determined via the second calculation 905C is 216⅔ people, which is higher than all of the queue sizes of the three queues 915, 925, and 935 taken into consideration in the third calculation 905C. Thus, 216⅔ is the optimal queue size that we will use here.

The calculations 905A, 905B, and 905C each represent an average—a mean in particular—of multiple queue sizes once the size 955 of the crowd 950 of FIG. 9A is added in to those queues. To be clear the size 955 of the crowd 950 is added into the numerator once in total—it is not added repeatedly so as to be added once per queue. Incorporation of the size 955 of the crowd 950 does not affect the denominator of this average/mean ratio that gives us the optimal queue size.

Figure 9C:
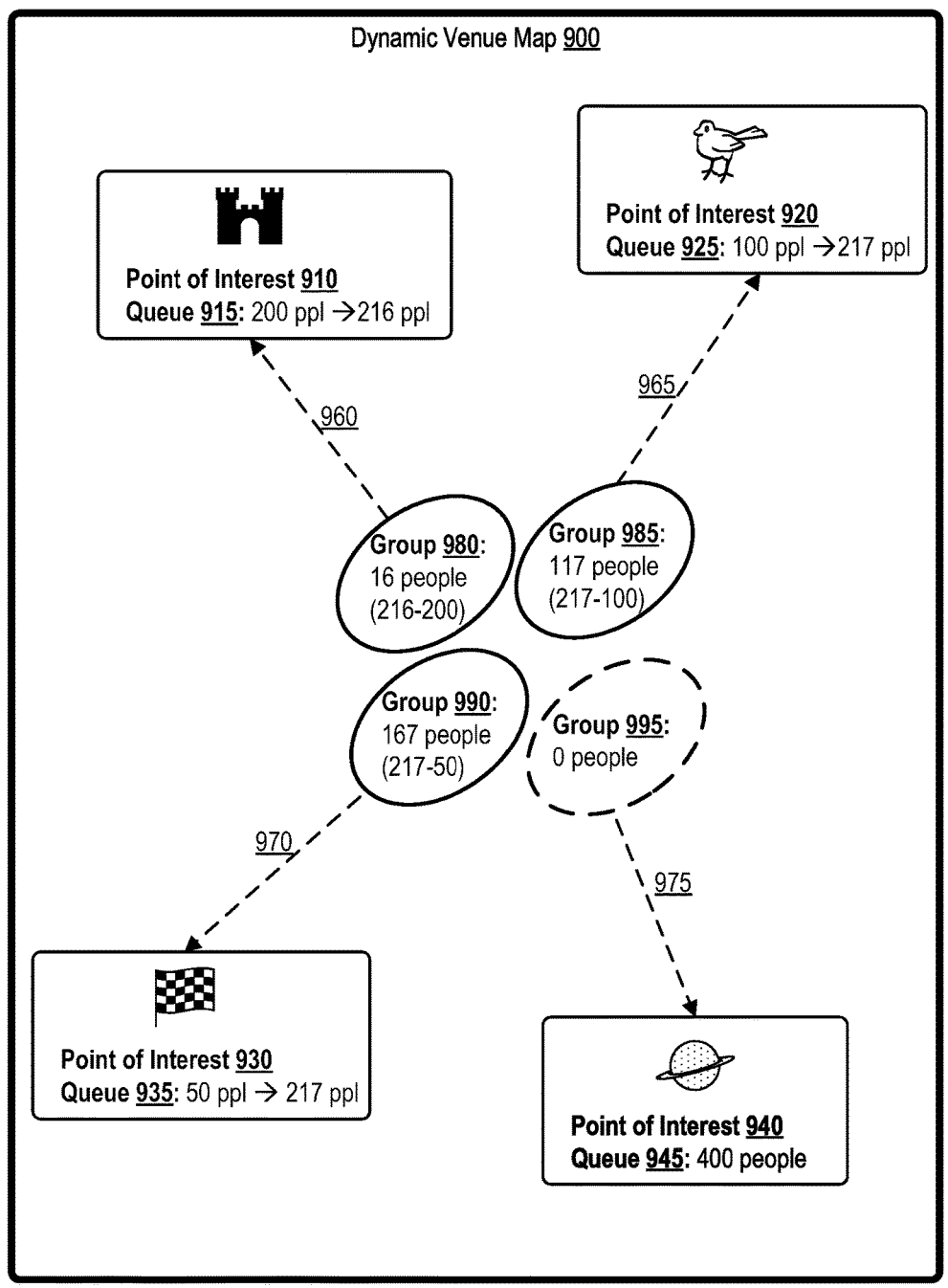
FIG. 9C illustrates the dynamic venue map of FIG. 9A identifying optimal dispersion of the crowd to the different points of interest.

To optimally disperse the crowd 950 of FIG. 9A toward the different queues of FIG. 9A, the EaaS platform 230 should direct the crowd 950 of FIG. 9A in a way that each of the three queues 915, 925, and 935 has 216⅔ people. This is then achieved, as illustrated in FIG. 9C and discussed further herein, by dividing the crowd 950 of FIG. 9A into different groups, and recommending different points of interest to each group, with each group's size determined based on a difference between the optimal queue size and the current queue size of that queue. Because queue 945 is already at 400 people, which is greater than the optimal queue size of 216⅔ people, zero members of the crowd 950 of FIG. 9A should be directed toward or recommended to go to queue 945.

Obviously, a queue can only have an integer number of people, so it makes little sense for a queue to aim for or target an optimal queue size of 216⅔ people. Because we have three queues, however, this issue is easily resolved—two queues should aim for a target queue size of 217 people (216⅔ rounded up to the next integer greater than 216⅔) and one queue should aim for a target queue size of 216 people (216⅔ rounded down to the next integer less than 216⅔).

Which queues get rounded down or up can be decided at random. Alternately, and as illustrated in FIG. 9B and 9C, the queues that are currently the shortest can be chosen to have a target queue size that is rounded up (here, to 217) while the queues that are currently the longest can be chosen to have a target queue size that is rounded down (here, to 216). This may help especially if the points of interest corresponding to those queues are known to be unpopular or widely disliked and it can be assumed that some venue attendees might ignore or disregard recommendations to go to those points of interest. Alternately, queue(s) that are farthest from any known congestion, such as the huge 400-person queue 945, can be chosen to aim for a higher target queue size.

Wider variations in target queue sizes can also be used. For example, while FIG. 9B and FIG. 9C illustrate a target queue size of 216 people for queue 915 and target queue sizes of 217 people for queues 925 and 935, the EaaS platform 230 and/or app server 125 could alternately provide a target queue size of 216 for queues 925 and 935 because they are close to already-large queue 945, and provide a target queue size of 218 for queue 915 because it is far from already-large queue 945.

FIG. 9C illustrates the dynamic venue map of FIG. 9A identifying optimal dispersion of the crowd to the different points of interest.

In particular, FIG. 9C illustrates the division by the EaaS platform 230 and/or app server 125 of the crowd 950 of FIG. 9A into four groups 980, 985, 990, and 995. The members of each of the four groups receive recommendations to go to different points of interest.

That is, the 16 members of group 980 are each recommended to go to the first point of interest 910 along path 960, which would bring the queue size of the queue 915 from 200 people to the target queue size of 216 people as illustrated in FIG. 9B. The 117 members of group 985 are each recommended to go to the second point of interest 920 along path 965, which would bring the queue size of the queue 925 from 100 people to the target queue size of 217 people as illustrated in FIG. 9B. The 167 members of group 990 are each recommended to go to the third point of interest 930 along path 970, which would bring the queue size of the queue 935 from 50 people to the target queue size of 217 people as illustrated in FIG. 9B. Group 995 includes zero members, and as such, nobody in the crowd 350 is recommended to go to the point of interest 940 along path 975, which would keep the queue size of the queue 945 at 400.

While the calculations herein do not factor in changes in queue size over time as the groups from the crowd move along the paths 960, 965, 970, 975—they may be modified to do so based on estimated movement speed of the members of the crowd 950, based on known traffic or congestion (or lack thereof) at different points in the venue that might affect the estimated movement speed, and based on estimated or observed speed or wait time of each of the different queues. Estimated movement speed of the members of the crowd 950 can be calculated on an individual basis for each member based on recent or historical movement speeds, and can be calculated differently based on movement type, such as walking, running, skateboarding, biking, taking a bus, taking a train, taking an automobile, taking a ski lift, taking a boat, or taking a plane. For example, if queue 945 is known to be moving much more quickly than queues 915, 925, 935—for example, because point of interest 940 is a vendor handing out free items without any need to use a register or point of sale device—the group 995 might have a few members of the crowd 350 because the size of the queue 945 can be estimated to very soon drop below the optimal queue size calculated in calculation 905B, 262.5 people.

While the term "queue" is used in FIG. 9A-9C and herein, it should be understood that this may also refer to crowds, groups, clusters, or any other grouping of venue attendees or other individuals. Furthermore, it should be understood the "crowd 350" was illustrated as a crowd for ease of discussion and need not be a crowd at all—in fact, the members of the "crowd 350" as discussed herein may be dispersed all throughout the venue area. The members of the "crowd 350" as discussed herein may be, for example, at least a subset of all venue attendees who are not currently at a point of interest or in a queue or crowd.

Figure 10A:
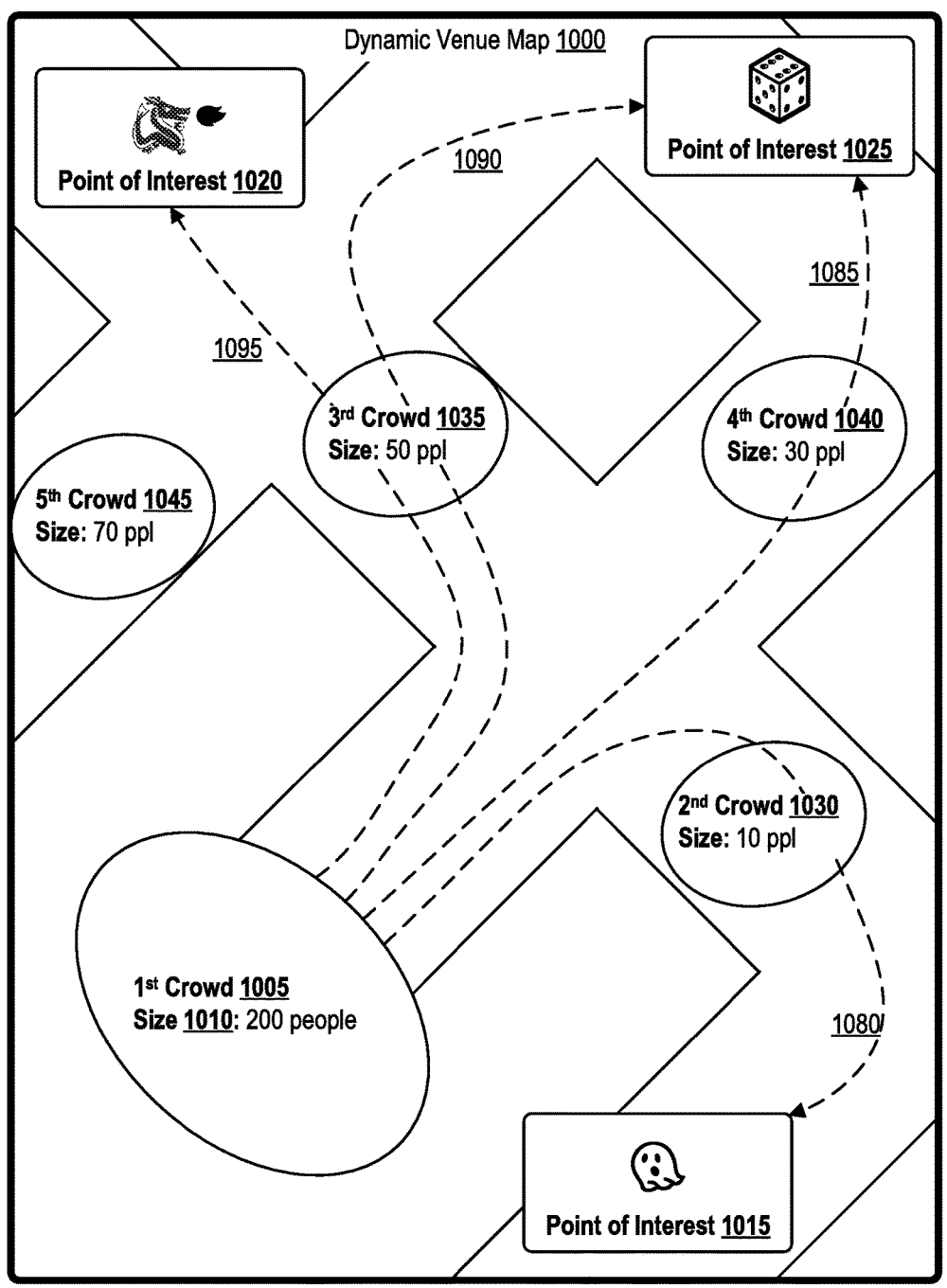
FIG. 10A illustrates a dynamic venue map identifying a five crowds and their corresponding sizes along with three points of interest.

FIG. 10A illustrates a dynamic venue map identifying a five crowds and their corresponding sizes along with three points of interest.

Like the dynamic venue map 900 of FIG. 9A, the dynamic venue map 1000 of FIG. 10A illustrates a first crowd 1005 with a size 1010 of 200 people (venue attendees). The dynamic venue map 1000 also includes three points of interest—a first ghost-themed point of interest 1015, a second dragon-themed point of interest 1020, and a third casino-themed point of interest 1025. The dynamic venue map 1000 also includes four smaller crowds along different paths in the venue—a second crowd 1030 with a size of 10 people (venue attendees), a third crowd 1035 with a size of 50 people (venue attendees), a fourth crowd 1040 with a size of 30 people (venue attendees), and a fifth crowd 1045 with a size of 70 people (venue attendees).

Figure 10B:
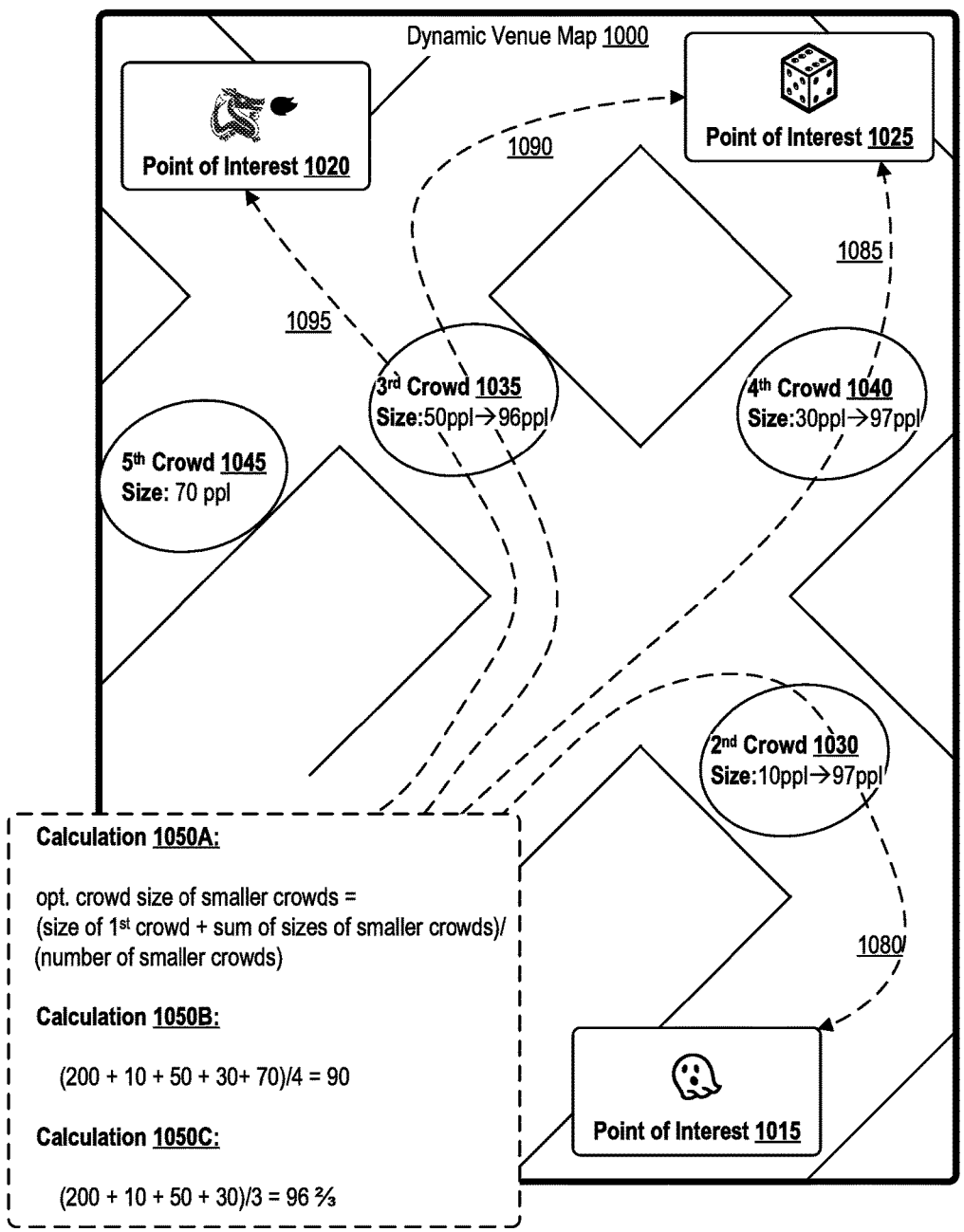
FIG. 10B illustrates the dynamic venue map of FIG. 10A identifying optimal crowd sizes of the four smaller crowds assuming that the largest crowd disperses toward the different points of interest but gets stuck in crowds along the way.
Figure 10C:
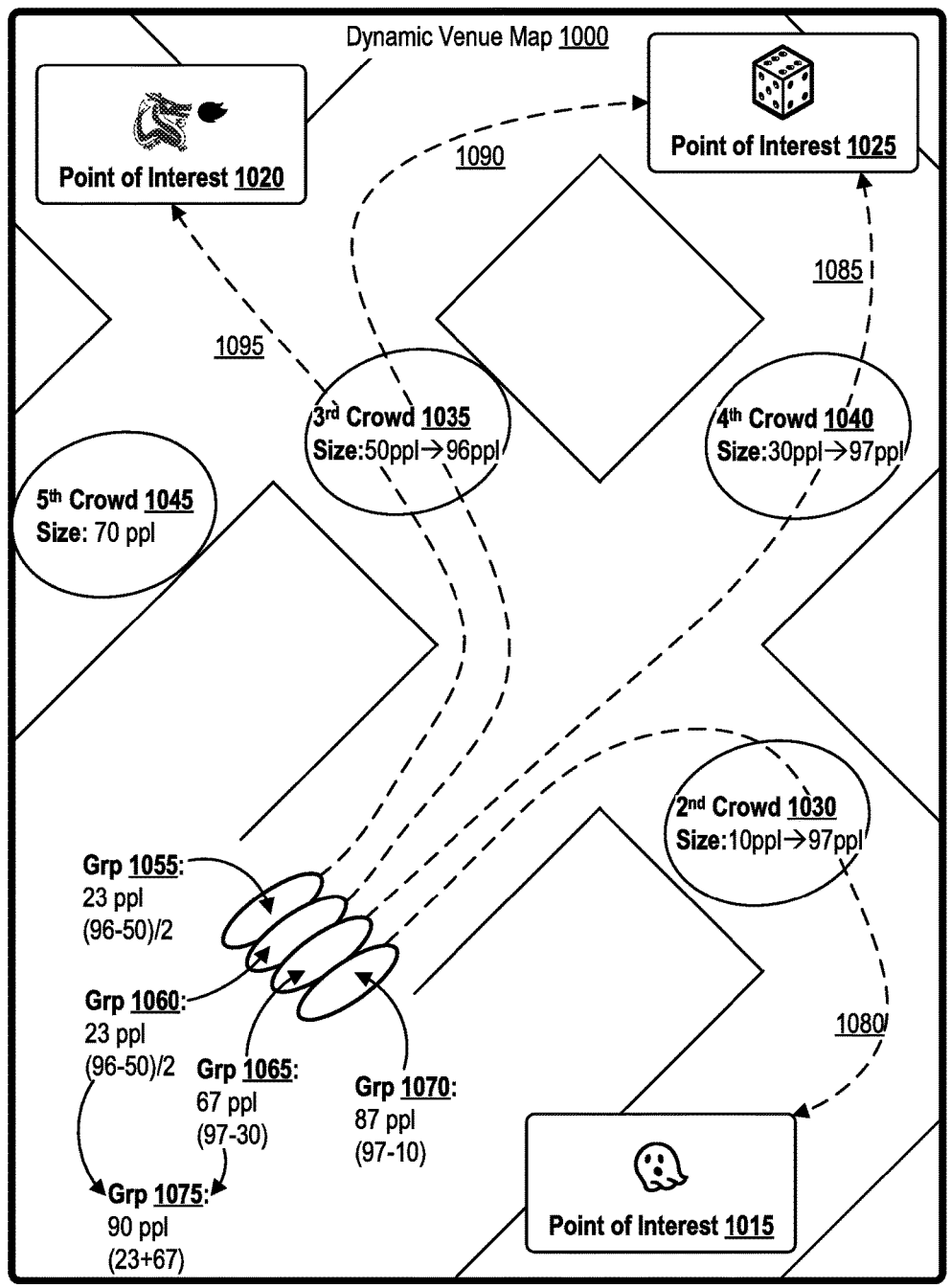
FIG. 10C illustrates the dynamic venue map of FIG. 10A identifying optimal dispersion of the largest crowd to the different points of interest assuming that the smaller crowds will absorb anyone moving through them.

Queues are not illustrated in or discussed regarding FIGS. 10A-C as they are illustrated in and discussed regarding FIGS. 9A-C. Instead, FIGS. 10A-C focus on minimizing overpopulation of any of the four smaller crowds 1030, 1035, 1040, and 1045 once the first crowd 1005 disperses toward the three points of interest 1015, 1020, and 1025.

The dynamic venue map 1000 of FIG. 10A also illustrates paths 1080, 1085, 1090, and 1095 from a location associated with the first crowd 1005 to the three points of interest 1015, 1020, and 1025. Specifically, path 1080 leads from the location associated with the first crowd 1005 to the first point of interest 1015, and passes through the second crowd 1030 along the way. Path 1085 leads from the location associated with the first crowd 1005 to the third point of interest 1025, and passes through the fourth crowd 1040 along the way. Path 1090 leads from the location associated with the first crowd 1005 to the third point of interest 1025, and passes through the third crowd 1035 along the way. Path 1095 leads from the location associated with the first crowd 1005 to the second point of interest 1020, and passes through the third crowd 1035 along the way. None of the paths 1080/1085/ 1090/1095 pass through the fifth crowd 1045.

FIG. 10B illustrates the dynamic venue map of FIG. 10A identifying optimal crowd sizes of the four smaller crowds assuming that the largest crowd disperses toward the different points of interest but gets stuck in crowds along the way.

The assumption for calculations 1050A, 1050B, and 1050C shown in FIG. 10B is that members of the first crowd 1005 have a high likelihood of being absorbed into any of the smaller crowds that they pass through. To this end, the calculations 1050A, 1050B, and 1050C shown in FIG. 10B identify one way of calculating an optimal crowds size for the smaller crowds assuming that the smaller crowds absorb all of the members of the crowd 1050 of FIG. 10A. Like the calculations of FIG. 9B, the calculations of FIG. 10B assume dispersal is instantaneous—that is, the calculations of FIG. 10B do not take into account any changes in the sizes of the smaller crowds anticipated in the time it takes for the members of the crowd 1005 to reach the various smaller crowds along paths 1080, 1085, 1090, and/or 1095. These calculation(s) are generally performed by the experience as a service (EaaS) platform 230 of FIG. 2 and/or the app server 125 of FIG. 1.

The first calculation 1050A serves is the base equation into which actual numerical values from FIG. 10A are plugged into. The first calculation 1050A identifies that the optimal crowds size is equal to a ratio, wherein the numerator of the ratio is a sum of the sizes of the four smaller crowds and the size 1010 of the first crowd 1005 (here, 200 people), and wherein the denominator of the ratio is the number of smaller crowds (here, four).

The second calculation 1050B plugs in the values for the four smaller crowds 1030, 1035, 1040, and 1045 into the equation of calculation 1050A. The resulting calculation is (200+10+50+30+70)/4=90. Thus, the optimal crowd size determined via the second calculation 1050B is 90 people. However, because the fifth crowd 1045 does not appear along any path, it is unlikely to absorb members of the crowd 1005 along their paths to the points of interest. Therefore, in calculation 1050C, the fifth crowd 1045 is omitted.

The third calculation 1050B plugs in the values for the second crowd 1030, the third crowd 1035, and the fourth crowd 1040, into the equation of calculation 1050A, but omits the fifth crowd 1045 as explained above. The resulting calculation is (200+10+50+30)/3=96⅔. Thus, the optimal crowd size determined via the third calculation 1050C is 96⅔ people.

The calculations 1050A, 1050B, and 1050C each represent an average—a mean in particular—of multiple sizes of the smaller crowds once the first crowd 1005 of FIG. 10A is added in to those smaller crowds.

FIG. 10C illustrates the dynamic venue map of FIG. 10A identifying optimal dispersion of the largest crowd to the different points of interest assuming that the smaller crowds will absorb anyone moving through them.

To optimally disperse the first crowd 1005 of FIG. 10A into the smaller crowds, the EaaS platform 230 should direct the first crowd 1005 in a way that each of the second crowd 1030, the third crowd 1035, and the fourth crowd 1040 has the optimal crowd size of 96⅔ people. As discussed with respect to the queues of FIG. 9C, the true target size for each of these smaller crowds may be rounded up to the nearest integer greater than the optimal crowd size, rounded down to the nearest integer less than the optimal crowd size, or otherwise adjusted based on estimated rate of travel of each of the members of the first crowd 1005, estimated rates of change in size of each of the smaller crowds, estimated movements of each of the smaller crowds, sizes of any queues at the points of interest, estimated rates of movement of any queues at the points of interest, estimated wait times of any queues at the points of interest, and so forth.

To accomplish this, the EaaS platform 230 divides the first crowd 1005 into different groups 1055, 1070, and 1075, and recommending different points of interest to each group, with each group's size determined based on a difference between the optimal crowd size and the current crowd size of crowds along paths to the point of interest.

First, the first crowd 1005 is actually divided into groups 1055, 1060, 1065, and 1075, wherein each of these groups takes a different one of the paths 1080, 1085, 1090, and 1095, respectively. That is, group 1070 takes path 1080, and therefore the size of group 1070 (87 people) is the difference of the target crowd size of the second crowd 1030 (97 people) and the actual crowd size of the second crowd 1030 (19 people). Group 1065 takes path 1085, and therefore the size of group 1065 (67 people) is the difference of the target crowd size of the fourth crowd 1040 (97 people) and the actual crowd size of the fourth crowd 1040 (30 people). Group 1060 takes path 1090 and group 1055 takes path 1095. Both paths 1090 and 1095 pass through the third crowd 1035, therefore the size of groups 1055 and 1060 (23 people) is one half to the difference of the target crowd size of the third crowd 1035 (96 people) and the actual crowd size of the third crowd 1035 (50 people). Because paths 1085 and 1090 both go to the third point of interest 1025, groups 1060 and 1065 are then merged together to form overarching group 1075 having 90 people (the sum of the sizes of groups 1060 and 1065).

The EaaS platform 230 and/or app server 125 then automatically generates and sends recommendations to each of the groups 1055, 1070, and 1075 to go to different points of interest. In particular group 1055 receives a recommendation to go to the first point of interest 1015. Group 1055 receives a recommendation to go to the second point of interest 1020. Group 1075 receives a recommendation to go to the third point of interest 1025.

While queues are not illustrated in or discussed regarding FIGS. 10A-C as they are illustrated in and discussed regarding FIGS. 9A-C, it should be understood that the queue management of FIGS. 9A-C may be combined with the crowd management of FIGS. 10A-C.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

While the foregoing written description enables one skilled in the art to make and use what is considered presently to be the best mode thereof, those skilled in the art will appreciate in light of the disclosure that the existence of variations, combinations, and equivalents of the specific aspects, embodiments, structures, modules, methods, and examples herein. The disclosure should therefore not be limited by the above described examples, but by all aspects of the present teachings within the scope and spirit of the disclosure.

What is claimed is:

1. A computer-implemented method for itinerary personalization for a plurality of venue attendees in a predetermined venue area, the method comprising:
identifying a number of venue attendees in the plurality of venue attendees;
receiving locations of a plurality of attendee mobile devices corresponding to the plurality of venue attendees;
retrieving locations of a plurality of points of interest located within the predetermined venue area, wherein each of the plurality of points of interest corresponds to a queue of a plurality of queues;
identifying a plurality of queue sizes by identifying a queue size of each queue of the plurality of queues;
calculating an optimal queue size to be an average queue size based on a sum of the plurality of queue sizes and the number of venue attendees in the plurality of venue attendees;
dividing the plurality of venue attendees into a plurality of groups based on the locations of the plurality of attendee mobile devices, wherein each group of the plurality of groups corresponds to one of the plurality of points of interest and to the queue corresponding to the point of interest, wherein a size of each group is based on a difference between the optimal queue size and the queue size of the queue corresponding to the group;
generating a plurality of recommendations, wherein each recommendation recommends one of the plurality of points of interests; and
sending the plurality of recommendations to the plurality of attendee mobile devices so that a different point of interest of the plurality of points of interest is recommended to each group of the plurality of groups based on the queue corresponding to the group.

2. The method of claim 1, wherein the optimal queue size is calculated by dividing the sum of the plurality of queue sizes and the number of venue attendees in the plurality of venue attendees by a number of queues in the plurality of queues.

3. The method of claim 1, wherein a size of a first group of the plurality of groups is the difference between the optimal queue size and the queue size of the queue corresponding to the first group, rounded up to the nearest integer value exceeding the difference.

4. The method of claim 1, wherein a size of a first group of the plurality of groups is the difference between the optimal queue size and the queue size of the queue corresponding to the first group, rounded down to the nearest integer value less than the difference.

5. The method of claim 1, wherein the size of each group is also based on minimizing foot traffic between the plurality of points of interest.

6. The method of claim 1, wherein at least one of the plurality of queues is a crowd.

7. The method of claim 1, wherein dividing the venue attendees into the plurality of groups is further based on the locations of each of the plurality of attendee mobile devices, such that a first venue attendee of the plurality of venue attendees is selected into a first group of the plurality of groups corresponding to a first point of interest of the plurality of points of interest, wherein a location of a first attendee mobile device associated with the first venue attendee is located closer to the first point of interest than to a remainder of the plurality of points of interest other than the first point of interest, wherein the first attendee mobile device is one of the plurality of attendee mobile devices.

8. The method of claim 1, wherein a location of a first attendee mobile device of the plurality of attendee mobile devices is identified using one or more Global Navigation Satellite System (GNSS) receivers of the first attendee mobile device.

9. The method of claim 1, wherein a location of a first attendee mobile device of the plurality of attendee mobile devices is identified based on the first attendee mobile device being in range of a short-range wireless signal source.

10. The method of claim 1, wherein the average queue size is a mean queue size.

11. The method of claim 1, further comprising:
identifying an additional point of interest other than the plurality of points of interest, the additional point of interest corresponding to an additional queue other than the plurality of queues;
calculating a second average queue size based on a sum of the plurality of queue sizes, an additional queue size corresponding to the additional queue, and the number of venue attendees in the plurality of venue attendees; and
identifying that the second average queue is not optimal because the additional queue size corresponding to the additional queue is greater than the second average queue size.

12. A system for itinerary personalization for a plurality of venue attendees in a predetermined venue area, the system comprising:
a memory that stores instructions, locations of a plurality of attendee mobile devices corresponding to the plurality of venue attendees, and locations of a plurality of points of interest located within the predetermined venue area, wherein each of the plurality of points of interest corresponds to a queue of a plurality of queues; and
a processor, wherein execution of the instructions by the processor causes the processor to:
identify a number of venue attendees in the plurality of venue attendees,
identify a plurality of queue sizes, wherein each queue of the plurality of queues corresponds to a queue size of the plurality of queue sizes,
calculate an optimal queue size to be an average queue size based on a sum of the plurality of queue sizes and the number of venue attendees in the plurality of venue attendees,
divide the plurality of venue attendees into a plurality of groups based on the locations of the plurality of attendee mobile devices, wherein each group of the plurality of groups corresponds to a queue of the plurality of queues and wherein a size of the group is based on a difference between the optimal queue size and the queue size corresponding to the queue, and generate a plurality of recommendations, wherein each recommendation recommends one of the plurality of points of interests; and a communication transceiver that sends the plurality of recommendations to the plurality of attendee mobile devices so that a different point of interest of the plurality of points of interest is recommended to each group of the plurality of groups based on the queue corresponding to the group.

13. The system of claim 12, wherein at least one of the plurality of queues is a crowd.

14. The system of claim 12, wherein dividing the venue attendees into the plurality of groups is further based on the locations of each of the plurality of attendee mobile devices, such that a first venue attendee of the plurality of venue attendees is selected into a first group of the plurality of groups corresponding to a first point of interest of the plurality of points of interest, wherein a location of a first attendee mobile device associated with the first venue attendee is located closer to the first point of interest than to a remainder of the plurality of points of interest other than the first point of interest, wherein the first attendee mobile device is one of the plurality of attendee mobile devices.

15. The system of claim 12, further comprising a beacon that emits a short-range wireless signal, wherein a location of a first attendee mobile device of the plurality of attendee mobile devices is identified based on the first attendee mobile device being in range of a short-range wireless signal source.

16. A method for itinerary personalization for a plurality of venue attendees in a predetermined venue area, the method comprising:

identifying a number of venue attendees in the plurality of venue attendees;

receiving, locations of a plurality of attendee mobile devices corresponding to the plurality of venue attendees;

retrieving locations of a plurality of points of interest located within the predetermined venue area;

identifying a plurality of crowd sizes, wherein each of a plurality of crowds located within the predetermined venue area corresponds to one of the plurality of crowd sizes;

calculating an optimal crowd size to be an average crowd size based on a sum of the plurality of crowd sizes and the number of venue attendees in the plurality of venue attendees;

dividing the plurality of venue attendees into a plurality of groups based on the locations of the plurality of attendee mobile devices, wherein each group of the plurality of groups corresponds to a point of interest of the plurality of points of interest and wherein a size of the group is based on a crowd of the plurality of crowds appearing along at least one path to from the group to the point of interest and wherein a size of the group is based on a difference between the optimal crowd size and the crowd size corresponding to the crowd;

generating a plurality of recommendations, wherein each recommendation recommends one of the plurality of points of interests; and sending the plurality of recommendations to the plurality of attendee mobile devices so that a different point of interest of the plurality of points of interest is recommended to each group of the plurality of groups based on the point of interest corresponding to the group.

17. The method of claim 16, wherein at least one of the plurality of crowds is a queue.

18. The method of claim 16, wherein a size of a first group of the plurality of groups is the difference between the optimal crowd size and the crowd size of the crowd corresponding to the first group, rounded up to the nearest integer value exceeding the difference.

19. The method of claim 16, wherein a size of a first group of the plurality of groups is the difference between the optimal crowd size and the crowd size of the crowd corresponding to the first group, rounded down to the nearest integer value less than the difference.

* * * * *